United States Patent
Shiina et al.

(10) Patent No.: US 8,961,363 B2
(45) Date of Patent: Feb. 24, 2015

(54) CONTINUOUSLY VARIABLE TRANSMISSION

(75) Inventors: Takahiro Shiina, Susono (JP); Akira Murakami, Gotenba (JP); Hiroyuki Ogawa, Susono (JP); Daisuke Tomomatsu, Susono (JP); Yuki Aratsu, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/394,596

(22) PCT Filed: Mar. 29, 2011

(86) PCT No.: PCT/JP2011/057902
§ 371 (c)(1),
(2), (4) Date: Mar. 7, 2012

(87) PCT Pub. No.: WO2012/131921
PCT Pub. Date: Oct. 4, 2012

(65) Prior Publication Data
US 2014/0011629 A1 Jan. 9, 2014

(51) Int. Cl.
*F16H 15/40* (2006.01)
*F16H 15/28* (2006.01)

(52) U.S. Cl.
CPC ............... *F16H 15/40* (2013.01); *F16H 15/28* (2013.01)
USPC ............................... 476/38; 476/37; 475/189

(58) Field of Classification Search
CPC .................................. F16H 15/40; F16H 15/28
USPC .................................. 476/36, 37, 38; 475/189
See application file for complete search history.

(56) References Cited

U.S. PATENT DOCUMENTS

| 3,248,960 | A | * | 5/1966 | Schottler | 475/115 |
|---|---|---|---|---|---|
| 4,069,718 | A | * | 1/1978 | F'Geppert | 476/36 |
| 4,203,328 | A | * | 5/1980 | DeBoynton | 74/25 |
| 5,318,486 | A | * | 6/1994 | Lutz | 475/214 |
| 5,577,423 | A | * | 11/1996 | Mimura | 74/650 |
| 5,722,910 | A | | 3/1998 | Folino | 476/36 |
| 6,551,210 | B2 | * | 4/2003 | Miller | 475/189 |
| 7,470,210 | B2 | * | 12/2008 | Miller et al. | 477/3 |
| 8,313,405 | B2 | * | 11/2012 | Bazyn et al. | 475/196 |
| 2001/0011049 | A1 | * | 8/2001 | Miller | 476/38 |
| 2009/0082169 | A1 | * | 3/2009 | Kolstrup | 476/38 |
| 2010/0120577 | A1 | * | 5/2010 | Gu et al. | 476/11 |

(Continued)

FOREIGN PATENT DOCUMENTS

| JP | 47-20535 | 6/1972 |
|---|---|---|
| JP | 49-12742 | 3/1974 |

(Continued)

*Primary Examiner* — David M Fenstermacher
(74) *Attorney, Agent, or Firm* — Finnegan, Henderson, Farabow, Garrett & Dunner, LLP

(57) ABSTRACT

Provided with first and second rotational members, a sun roller, a plurality of planetary balls sandwiched between the first and second rotational members, a support shaft of each of the planetary balls, a shaft, a carrier, an iris plate and a worm gear for tilting each of the planetary balls, and an input shaft and an output shaft individually fixed to the first and second rotational members, respectively, in which a movable amount of the sun roller relative to the carrier in an axis line direction is set to be smaller than the movable amount of the second rotational member relative to the carrier in the axis line direction when the input shaft is arranged so as to be relatively rotatable on an outer peripheral surface of the output shaft.

16 Claims, 10 Drawing Sheets

(56) References Cited

U.S. PATENT DOCUMENTS

| | | |
|---|---|---|
| 2010/0267510 A1 | 10/2010 | Nichols et al. |
| 2012/0322609 A1* | 12/2012 | Ogawa et al. .................... 476/38 |
| 2013/0116084 A1* | 5/2013 | McMahon et al. ................ 476/1 |
| 2013/0190131 A1* | 7/2013 | Versteyhe et al. ................ 476/31 |
| 2014/0235401 A1* | 8/2014 | Tomomatsu et al. ........... 476/38 |
| 2014/0274552 A1* | 9/2014 | Frink et al. ...................... 476/36 |
| 2014/0287868 A1* | 9/2014 | Meyer ............................. 476/38 |

FOREIGN PATENT DOCUMENTS

| | | |
|---|---|---|
| JP | 51-150380 | 12/1976 |
| JP | 52-35481 | 3/1977 |
| JP | 55-135259 | 10/1980 |

* cited by examiner

US 8,961,363 B2

CONTINUOUSLY VARIABLE TRANSMISSION

CROSS-REFERENCE TO RELATED APPLICATIONS

This application is a national phase application of International Application No. PCT/JP2011/057902, filed Mar. 29, 2011, the contents of which are incorporated herein by reference.

FIELD

The present invention relates to a continuously variable transmission including a plurality of rotational elements having a common axis of rotation and a plurality of rolling members arranged radially around the axis of rotation, which continuously changes a transmission ratio between input and output by tilting each of the rolling members sandwiched between two of the rotational elements.

BACKGROUND

As this type of continuously variable transmission, the one provided with a so-called traction planetary gear mechanism, including a transmission shaft, which is a center of rotation, a plurality of rotational elements capable of relatively rotating of which first central axis of rotation is a central axis of the transmission shaft, and a plurality of rolling members each having another second central axis of rotation parallel to the first central axis of rotation radially arranged around the first central axis of rotation, in which each of the rolling members is sandwiched between a first rotational element and a second rotational element arranged so as to be opposed to each other and each of the rolling members is arranged on an outer peripheral surface of a third rotational element for continuously changing the transmission ratio by tilting the rolling members is conventionally known. The continuously variable transmission is provided with a support shaft (axis of rotation), which allows the rolling member to rotate on its axis and supports the same, and a fixed element, which holds the rolling member through each projection from the rolling member on the support shaft. For example, following patent literatures 1 to 3 disclose this type of continuously variable transmission. In the continuously variable transmission of the patent literature 1, a sun roller as the third rotational element has a structure divided into two in an axis line direction to be supported by an angular bearing. Also, in the continuously variable transmission, the sun roller is fixed to a carrier as the fixed element by means of a snap ring. The continuously variable transmission of the patent literatures 2 and 3 is provided with an iris plate (disk-shaped member) for tilting the rolling member. The iris plate is provided with an iris groove into which an end of the support shaft is inserted and guides the end of the support shaft between an extreme deceleration portion on which the transmission ratio is on an extreme deceleration side and an extreme acceleration portion on which the transmission ratio is on an extreme acceleration side in the iris groove together with its own rotation by a worm gear. Meanwhile, in the continuously variable transmission of the patent literature 3, a disk as the first rotational element and the second rotational element is arranged on an inner side in a radial direction than the rolling member.

CITATION LIST

Patent Literature

Patent Literature 1: U.S. Patent Application Laid-open No. 2010/0267510
Patent Literature 2: Japanese Utility Model Application Laid-open No. 51-150380
Patent Literature 3: Japanese Patent Application Laid-open No. 55-135259

SUMMARY

Technical Problem

In this type of continuously variable transmission, it is required to provide a sufficient gap in the axis line direction between the rolling member and the fixed member (carrier) so as to prevent them from interfering with each other, so that positioning of the rolling member in the axis line direction is important. However, the above-described patent literatures 1 to 3 do not disclose the positioning of the rolling member. Therefore, in order to perform the positioning of the rolling member based on the structure of the continuously variable transmission disclosed in the patent literatures 1 to 3, the number of components required for the positioning increases and it is required to improve dimensional accuracy and accuracy related to arrangement for each of the components, so that a cost might increase.

Therefore, an object of the present invention is to improve disadvantage of the conventional examples and to provide the continuously variable transmission capable of realizing the positioning of the rolling member in the axis line direction at a low cost.

Solution to Problem

In order to achieve the above mentioned object, a continuously variable transmission according to the present invention includes a transmission shaft as a fixed shaft being a center of rotation; a relatively rotatable first rotational element and a relatively rotatable second rotational element having a common first central axis of rotation arranged so as to be opposed to each other on the transmission shaft; a plurality of rolling members each having a second central axis of rotation parallel to the first central axis of rotation radially arranged around the first central axis of rotation to be sandwiched between the first rotational element and the second rotational element; a support shaft of each of the rolling members having the second central axis of rotation with both ends projected from the rolling member; a third rotational element with each of the rolling members arranged on a concave portion of which caved radially inwardly on an outer peripheral surface, capable of rotating relative to the transmission shaft, the first rotational element, and the second rotational element; a fixed element fixed to the transmission shaft, that holds the rolling member through each projection of the support shaft; a transmission device that changes a rotational ratio between the first rotational element and the second rotational element by tilting operation of each of the rolling members; a first rotational shaft and a second rotational shaft individually fixed to the first rotational element and the second rotational element, respectively; a first positioning structure that sets a movable amount of the first rotational element relative to the fixed element in an axis line direction; a second positioning structure that sets the movable amount of the second rotational element relative to the fixed element in the axis line direction; and a third positioning structure that sets the movable amount of the third rotational element relative to the fixed element in the axis line direction, wherein the second rotational shaft fixed to the second rotational element is arranged such that rotation relative to the transmission shaft around the first central axis of rotation can be performed, and the first rotational shaft fixed to the first rotational element is arranged such that the rotation relative to the second rotational shaft around the first central axis of rotation can be performed on an outer peripheral surface of the second rotational shaft, and the movable amount of the third rotational element relative to the fixed element in the axis line direction is set to be smaller than the movable amount of the second rotational element relative to the fixed element in the axis line direction.

Here, it is desirable that the movable amount of the rolling member relative to the third rotational element in the axis line direction generated by a sideslip force associated with displacement of the support shaft is set to be smaller than a sum of the movable amount of the second rotational element relative to the fixed element in the axis line direction and the movable amount of the third rotational element relative to the fixed element in the axis line direction.

In order to achieve the above mentioned object, a continuously variable transmission according to the present invention includes a transmission shaft as a fixed shaft being a center of rotation; a relatively rotatable first rotational element and a relatively rotatable second rotational element having a common first central axis of rotation arranged so as to be opposed to each other on the transmission shaft; a plurality of rolling members each having a second central axis of rotation parallel to the first central axis of rotation radially arranged around the first central axis of rotation to be sandwiched between the first rotational element and the second rotational element; a support shaft of each of the rolling members having the second central axis of rotation with both ends projected from the rolling member; a third rotational element with each of the rolling members arranged on a concave portion of which caved radially inwardly on an outer peripheral surface, capable of rotating relative to the transmission shaft, the first rotational element, and the second rotational element; a fixed element fixed to the transmission shaft, which holds the rolling member through each projection of the support shaft; a transmission device that changes a rotational ratio between the first rotational element and the second rotational element by tilting operation of each of the rolling members; a first rotational shaft and a second rotational shaft individually fixed to the first rotational element and the second rotational elements, respectively, capable of rotating relative to the transmission shaft around the first central axis of rotation on an outer peripheral surface of the transmission shaft; a first positioning structure that sets a movable amount of the first rotational element relative to the fixed element in an axis line direction; a second positioning structure that sets the movable amount of the second rotational element relative to the fixed element in the axis line direction; and a third positioning structure that sets the movable amount of the third rotational element relative to the fixed element in the axis line direction, wherein the movable amount of the third rotational element relative to the fixed element in the axis line direction is set to be smaller than a smaller one of the movable amount of the first rotational element relative to the fixed element in the axis line direction and the movable amount of the second rotational element relative to the fixed element in the axis line direction.

Here, it is desirable that the movable amount of the rolling member relative to the third rotational element in the axis line direction generated by a sideslip force associated with displacement of the support shaft is set to be smaller than a sum of the smaller one of the movable amount of the first rotational element relative to the fixed element in the axis line direction and the movable amount of the second rotational element relative to the fixed element in the axis line direction, and the movable amount of the third rotational element relative to the fixed element in the axis line direction.

It is desirable that the third positioning structure sets the movable amount of the third rotational element relative to the fixed element in the axis line direction to 0 by a fastening member that presses the third rotational element toward the fixed element in the axis line direction.

Further, it is desirable that the third positioning structure provides an axial force transmitting member inserted into an opening of the fixed element between the third rotational element and the fastening member.

Further, it is desirable that the fixed element is integrally formed.

Advantageous Effects of Invention

The continuously variable transmission according to the present invention can perform the positioning of the rolling member in the axis line direction by the fixed element and the third rotational element having the concave portion. That is to say, in the continuously variable transmission, it is only necessary to improve the dimensional accuracy and the accuracy related to the arrangement of the fixed element, the third rotational element, and the components related to them (the components for attaching them and the like) for the positioning of the rolling member. Therefore, the continuously variable transmission according to the present invention can realize the positioning of the rolling member in the axis line direction at a low cost because of the small number of the components of which required accuracy is high.

DESCRIPTION OF EMBODIMENTS

Embodiments of a continuously variable transmission according to the present invention are hereinafter described in detail with reference to the drawings. Meanwhile, the present invention is not limited by the embodiments.

First Embodiment

A first embodiment of the continuously variable transmission according to the present invention is described with reference to FIGS. 1 to 4.

Figure 1:
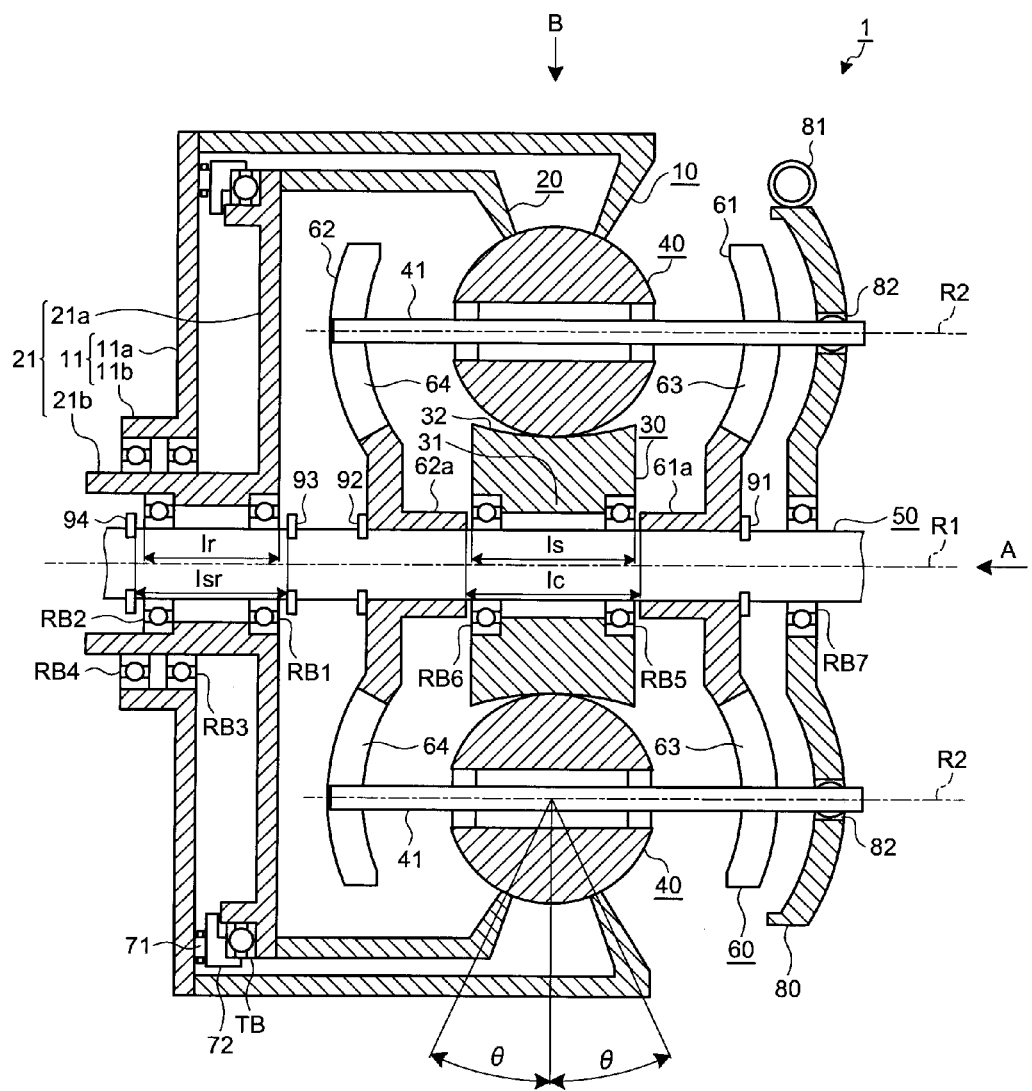
FIG. 1 is a partial cross-sectional view for illustrating a configuration of a first embodiment of a continuously variable transmission according to the present invention.
Figure 2:
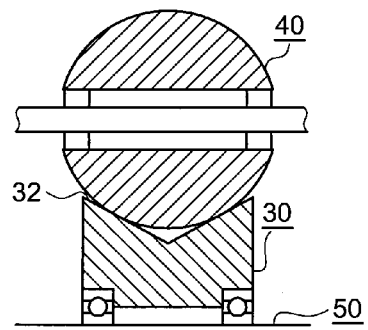
FIG. 2 is a view for explaining a concave portion of another mode of a sun roller.

First, an example of the continuously variable transmission of this embodiment is described with reference to FIG. 1. A reference sign 1 in FIG. 1 represents the continuously variable transmission of this embodiment.

A continuously variable transmission mechanism, which composes a substantial part of the continuously variable transmission 1, is a so-called traction planetary gear mechanism provided with first to third rotational elements 10, 20, and 30 having a common first central axis of rotation R1 capable of rotating relative to one another, a plurality of rolling members 40 each having a second central axis of rotation R2 different from the first central axis of rotation R1 parallel to the same on a reference position to be described later, a shaft 50 as a transmission shaft arranged on a center of rotation of the first to third rotational elements 10, 20, and 30, and a fixed element 60 fixed to the shaft 50 to tiltably hold each of the rolling members 40. The continuously variable transmission 1 is configured to change a transmission ratio γ between input and output by inclining the second central axis of rotation R2 with respect to the first central axis of rotation R1, thereby tilting the rolling members 40. Hereinafter, unless otherwise mentioned, a direction along the first central axis of rotation R1 and the second central axis of rotation R2 is referred to as an axis line direction and a direction around the first central axis of rotation R1 is referred to as a circumferential direction. Also, a direction orthogonal to the first central axis of rotation R1 is referred to as a radial direction in which an inward direction is referred to as a radially inward direction and an outward direction is referred to as a radially outward direction.

In the continuously variable transmission 1, torque is transmitted among the first rotational element 10, the second rotational element 20, and the third rotational element 30 through each of the rolling members 40. For example, in the continuously variable transmission 1, one of the first to third rotational elements 10, 20, and 30 becomes an input unit of the torque (power) and at least one of remaining rotational elements becomes an output unit of the torque. Therefore, in the continuously variable transmission 1, a ratio of a rotational speed (rotational number) between any rotational element, which becomes the input unit, and any rotational element, which becomes the output unit, is the transmission ratio γ. For example, the continuously variable transmission 1 is arranged on a power transmission path of a vehicle. At that time, the input unit is connected to a power source side such as an engine and a motor and the output unit is connected to a drive wheel side. In the continuously variable transmission 1, rotational operation of each rotational element when the torque is input to the rotational element as the input unit is referred to as forward drive and the rotational operation of each rotational element when the torque in a direction opposite to that of the forward drive is input to the rotational element as the output unit is referred to as reverse drive. For example, according to the above illustration of the vehicle, in the continuously variable transmission 1, it is a time of the forward drive when the torque is input from the power source side to the rotational element as the input unit to rotate the rotational element such as a time of acceleration and it is a time of the reverse drive when the torque in the direction opposite to that of the forward drive is input from the drive wheel side to the rotating rotational element as the output unit such as a time of deceleration.

In the continuously variable transmission 1, the plurality of rolling members 40 are radially arranged around the central axis (first central axis of rotation R1) of the shaft 50. Each of the rolling members 40 is sandwiched between the first rotational element 10 and the second rotational element 20 arranged so as to be opposed to each other and is arranged on an outer peripheral surface of the third rotational element 30. Also, each of the rolling members 40 rotates on its central axis of rotation (second central axis of rotation R2). The continuously variable transmission 1 presses at least one of the first and second rotational elements 10 and 20 against the rolling member 40, thereby generating an appropriate tangential force (traction force) between the first to third rotational elements 10, 20, and 30 and the rolling member 40 to enable transmission of the torque therebetween. Also, the continuously variable transmission 1 tilts each of the rolling members 40 on a tilting plane including its second central axis of rotation R2 and the first central axis of rotation R1 to change the ratio of the rotational speed (rotational number) between the first rotational element 10 and the second rotational element 20, thereby changing the ratio of the rotational speed (rotational number) between the input and output.

Herein, in the continuously variable transmission 1, the first and second rotational elements 10 and 20 serve as ring gears in a planetary gear mechanism. Also, the third rotational element 30 serves as a sun roller of the traction planetary gear mechanism. Also, the rolling member 40 serves as a ball-type pinion in the traction planetary gear mechanism and the fixed element 60 serves as a carrier. Hereinafter, the first and second rotational elements 10 and 20 are referred to as "first and second rotational members 10 and 20", respectively. Also, the third rotational element 30 is referred to as a "sun roller 30" and the rolling member 40 is referred to as a "planetary ball 40". Also, the fixed element 60 is referred to as a "carrier 60".

Also, the shaft 50 is fixed to a fixed section of the continuously variable transmission 1 in a casing, a vehicle body and the like not illustrated, and is a columnar fixed shaft configured so as not to be rotated relative to the fixed section.

The first and second rotational members 10 and 20 are disk-shaped members (disks) or annular members (rings) of which central axes conform to the first central axis of rotation R1 and are arranged so as to be opposed to each other in the axis line direction to sandwich each of the planetary balls 40 therebetween. In this illustration, both of them are the annular members.

Each of the first and second rotational members 10 and 20 has a contacting surface, which comes in contact with an outer peripheral curved surface on an outer side in the radial direction of each of the planetary balls 40 to be described later in detail. Each of the contacting surfaces has a shape of a concave circular-arc surface with a curvature equivalent to the curvature of the outer peripheral curved surface of the planetary ball 40, the concave circular-arc surface with the curvature different from the curvature of the outer peripheral curved surface, a convex circular-arc surface, a flat surface and the like, for example. Herein, each of the contacting surfaces is formed such that distances from the first central axis of rotation R1 to contacting portions thereof with each of the planetary balls 40 are the same in a state of the reference position to be described later, thereby making contacting angles θ of the first and second rotational members 10 and 20 with each of the planetary balls 40 the same. The contacting angle θ is intended to mean the angle between a criterion and the contacting portion with each of the planetary balls 40. Herein, the radial direction is the criterion. Each of the contacting surfaces comes into point contact or surface contact with the outer peripheral curved surface of the planetary ball 40. Also, each of the contacting surfaces is formed such that, when a force (pressing force) in the axis line direction is applied from the first and second rotational members 10 and 20 to the planetary ball 40, a force (normal force) in the radially inward direction and in an oblique direction is applied to the planetary ball 40.

In this illustration, the first rotational member 10 is allowed to act as a torque input unit at the time of the forward drive of the continuously variable transmission 1 and the second rotational member 20 is allowed to act as a torque output unit at the time of the forward drive of the continuously variable transmission 1. Therefore, an input shaft (first rotational shaft) 11 is connected to the first rotational member 10 and an output shaft (second rotational shaft) 21 is connected to the second rotational member 20. Meanwhile, in the continuously variable transmission 1, the input shaft 11 may be used as the output shaft and the output shaft 21 may be used as the input shaft.

The output shaft 21 is provided with a disk-shaped portion 21a and a cylindrical portion 21b of which central axes conform to the first central axis of rotation R1. The cylindrical portion 21b is provided on an inner peripheral side of the disk-shaped portion 21a and an inner peripheral surface thereof is attached to an outer peripheral surface of the shaft 50 through radial bearings RB1 and RB2. Therefore, the output shaft 21 and the second rotational member 20 connected to the same can rotate relative to the shaft 50 in the circumferential direction.

The input shaft 11 also is provided with a disk-shaped portion 11a and a cylindrical portion 11b of which central axes conform to the first central axis of rotation R1 similar to those of the output shaft 21. An inner peripheral surface of the cylindrical portion 11b is attached to an outer peripheral surface of the cylindrical portion 21b of the output shaft 21 through radial bearings RB3 and RB4. The input shaft 11 can rotate relative to the output shaft 21 in the circumferential direction by the radial bearings RB3 and RB4 and a following thrust bearing TB.

Herein, a torque cam 71, an annular member 72, and the thrust bearing TB are arranged between flat surfaces on an outer peripheral side of each of the disk-shaped portion 11a of the input shaft 11 and the disk-shaped portion 21a of the output shaft 21. The annular member 72 and the output shaft 21 can rotate relative to each other through the thrust bearing TB. The torque cam 71 generates an axial force and transmits rotational torque between the input shaft 11 and the annular member 72 by engagement of an engaging member on an input shaft 11 side and the engaging member on the annular member 72 side, and rotates them integrally. The axial force is transmitted to the first rotational member 10 and the second rotational member 20 to become the pressing force when they press each of the planetary balls 40.

The sun roller 30 has a cylindrical shape of which central axis conforms to the first central axis of rotation R1 and can rotate relative to the shaft 50 in the circumferential direction by radial bearings RB5 and RB6. The sun roller 30 is provided with an annular portion 31 protruded radially inwardly on a central portion on an inner peripheral surface side thereof. The radial bearings RB5 and RB6 are press-fitted to the sun roller 30 such that outer rings thereof abut side surfaces of the annular portion 31.

Also, a plurality of planetary balls 40 are radially arranged at substantially regular intervals on the outer peripheral surface of the sun roller 30. Therefore, in the sun roller 30, the outer peripheral surface is a rolling surface when the planetary ball 40 rotates on its axis. On the rolling surface, a concave portion 32 obtained by caving a central portion thereof in the axis line direction radially inwardly from both end sides is formed. The concave portion 32 is formed on an entire circumference in the circumferential direction. Also, the concave portion 32 may have a curved shape illustrated in FIG. 1 or have a V-shape illustrated in FIG. 2, for example. Each of the planetary balls 40 is arranged so as to be located on a central portion (most concave portion) of the concave portion 32 when being driven. Therefore, movement of the planetary ball 40 relative to the sun roller 30 in the axis line direction is inhibited as compared to a case of the rolling surface without the concave portion 32. The sun roller 30 can allow each of the planetary balls 40 to roll (rotate on its axis) by its rotational operation or can rotate in association with rolling operation (rotational operation on its axis) of each of the planetary balls 40.

The planetary ball 40 is the rolling member, which rolls on the outer peripheral surface of the sun roller 30. Although it is preferable that the planetary ball 40 has a complete spherical shape, this may have a shape, which is spherical at least in a rolling direction, such as a rugby ball with an oval cross section. The planetary ball 40 is rotatably supported by a support shaft 41, which penetrates the same through the center thereof. For example, the planetary ball 40 is configured to be able to rotate relative to the support shaft 41 around the second central axis of rotation R2 as the axis of rotation (that is to say, rotate on its axis) by a bearing (not illustrated) arranged between the same and an outer peripheral surface of the support shaft 41. Therefore, the planetary ball 40 can roll on the outer peripheral surface of the sun roller 30 around the support shaft 41. Both ends of the support shaft 41 are allowed to project from the planetary ball 40. Meanwhile, there is a minute backlash (gap) by the bearing and the like between the planetary ball 40 and the support shaft 41.

A reference position of the support shaft 41 is a position at which the second central axis of rotation R2 is parallel to the first central axis of rotation R1 as illustrated in FIG. 1. The support shaft 41 can pivot (tilt) together with the planetary ball 40 between the reference position and a position inclined therefrom in the tilting plane including its central axis of rotation formed on the reference position (second central axis of rotation R2) and the first central axis of rotation R1. This is tilted in the tilting plane with the center of the planetary ball 40 as a supporting point.

The carrier 60 holds each projection of the support shaft 41 so as not to block tilting operation of each of the planetary balls 40. The carrier 60 is obtained by arranging first and second disk-shaped members 61 and 62 of which central axes conform to the first central axis of rotation R1 so as to be opposed to each other and connecting the first and second disk-shaped members 61 and 62 to each other by a plurality of connecting shafts 65 (FIG. 3), thereby forming a basket shape as a whole, for example. According to this, the carrier 60 has an open portion on an outer peripheral surface thereof. Each of the planetary balls 40 is arranged between the first and second disk-shaped members 61 and 62 and comes into contact with the first rotational member 10 and the second rotational member 20 through the open portion.

The carrier 60 is such that an inner peripheral surface side of each of the first and second disk-shaped members 61 and 62 is fixed to an outer peripheral surface side of the shaft 50 so as to prevent rotation in the circumferential direction and movement in the axis line direction relative to the shaft 50. For example, the carrier 60 can forbid such relative rotation in the circumferential direction by performing spline fitting of inner peripheral surfaces of the first and second disk-shaped members 61 and 62 to the outer peripheral surface of the shaft 50. The carrier 60 is provided with annular portions 61a and 62a provided so as to be extended in the axis line direction toward the sun roller 30 side on an inner peripheral surface side thereof. Therefore, when the spline fitting is applied, spline is formed on inner peripheral surfaces of the annular portions 61a and 62a. Also, in this illustration, locking members 91 and 92 such as snap rings are arranged on side surfaces in the axis line direction of the carrier 60 so as to prevent the relative movement in the axis line direction. Meanwhile, the carrier 60 may regulate the relative rotation and the relative movement by being press-fitted to the shaft 50.

Figure 3:
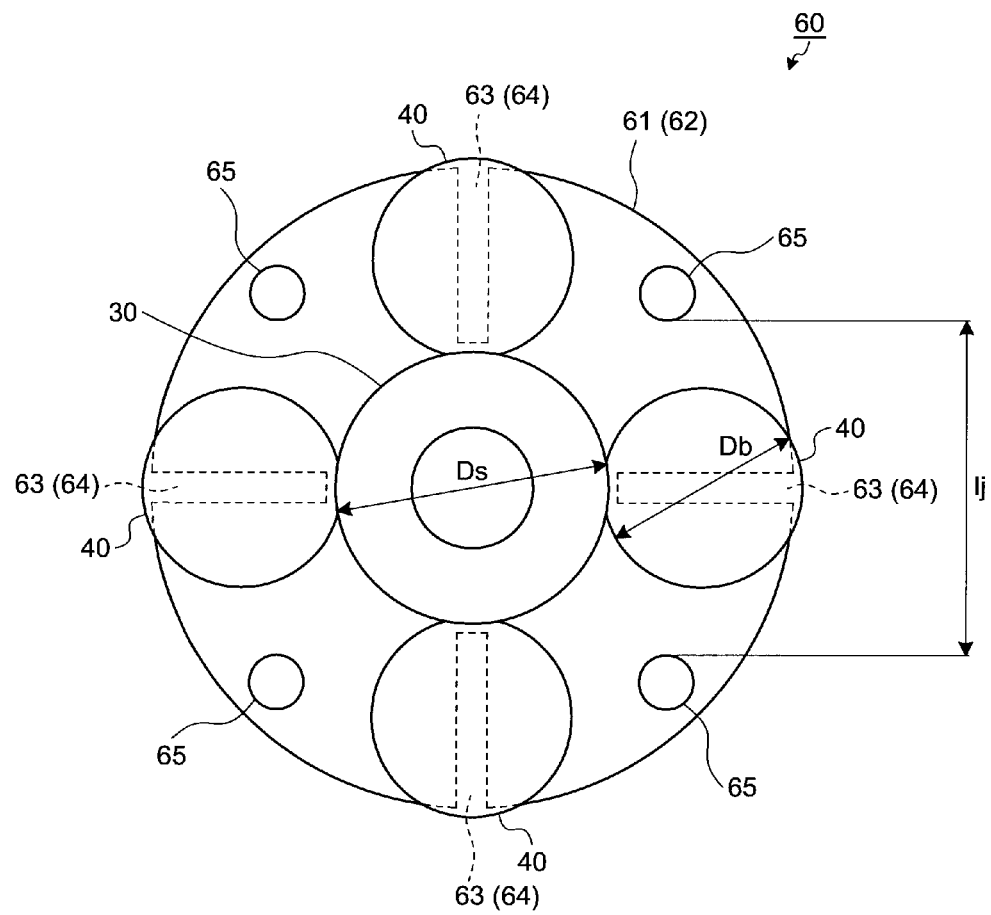
FIG. 3 is a view for explaining a guide groove of a carrier and an interval between connecting shafts.

The continuously variable transmission 1 is provided with a guide unit for guiding the support shaft 41 in a tilting direction when tilting each of the planetary balls 40. In this illustration, the guide unit is provided on the carrier 60. The guide unit is guide grooves 63 and 64 in the radial direction, which guide the support shaft 41 projected from the planetary ball 40 in the tilting direction, formed for each of the planetary balls 40 on portions opposed to each other on the first and second disk-shaped members 61 and 62 (FIG. 3). That is to say, all the guide grooves 63 and all the guide grooves 64 are radially arranged as seen in the axis line direction (direction indicated by an arrow A in FIG. 1). A groove width of the guide groove 63 is the circumferential direction of the first disk-shaped member 61 and a groove bottom thereof is an inner side in the radial direction. Similarly, the groove width of the guide groove 64 is the circumferential direction of the second disk-shaped member 62 and the groove bottom thereof is the inner side in the radial direction. A gap is provided between the support shaft 41 and the guide grooves 63 and 64 in the groove width direction so as to realize the tilting operation and smoothly perform the operation. The gap has a size required for causing sideslip between the sun roller 30 and the planetary ball 40 for the tilting operation, for example.

Herein, when fixing the carrier 60 to the shaft 50, the sun roller 30 to which the radial bearings RB5 and RB6 are fitted is arranged between the first disk-shaped member 61 and the second disk-shaped member 62 of the carrier 60 formed to have the basket shape and the shaft 50 is inserted into the first and second disk-shaped members 61 and 62 and the radial bearings RB5 and RB6. Therefore, in the continuously variable transmission 1, an interval Ij between the adjacent connecting shafts 65 is made larger than a diameter Ds of the sun roller 30 as illustrated in FIG. 3 such that the sun roller 30 can be arranged between the first disk-shaped member 61 and the second disk-shaped member 62 of the carrier 60 having the basket shape. Also, in the continuously variable transmission 1, the planetary ball 40 into which the support shaft 41 is inserted is assembled from the outer side in the radial direction after the shaft 50 is assembled. Therefore, the interval Ij between the connecting shafts 65 is made larger than a diameter Db of the planetary ball 40.

Further, in the carrier 60, diameters (maximum outer diameters) of the first and second disk-shaped members 61 and 62 are made smaller than inner diameters (minimum inner diameters) of the first rotational member 10 and the second rotational member 20 on the contacting portions with the planetary ball 40. This is for preventing outer shapes of the first and second disk-shaped members 61 and 62 from blocking insertion of the first and second rotational members 10 and 20 because the first and second rotational members 10 and 20 are inserted into the shaft 50 after the above-described planetary ball 40 is assembled to the carrier 60.

In the continuously variable transmission 1, the first rotational member 10 and the second rotational member 20 rotate at the same rotational speed (same rotational number) when each of the planetary balls 40 is on the reference position, that is to say, a tilting angle thereof is 0 degree. That is to say, at that time, a rotational ratio (ratio of the rotational speed or the rotational number) between the first rotational member 10 and the second rotational member 20 is 1 and the transmission ratio γ is 1. On the other hand, when each of the planetary balls 40 is tilted from the reference position, the distance from the central axis of the support shaft 41 to the contacting portion with the first rotational member 10 changes and the distance from the central axis of the support shaft 41 to the contacting portion with the second rotational member 20 changes. Therefore, any one of the first rotational member 10 and the second rotational member 20 rotates at a higher speed and the other rotates at a lower speed as compared to a case of the reference position. For example, the second rotational member 20 rotates at the lower speed than the first rotational member 10 (decelerated) when the planetary ball 40 is tilted in one direction and rotates at the higher speed than the first rotational member 10 (accelerated) when this is tilted in the other direction. Therefore, in the continuously variable transmission 1, the rotational ratio (transmission ratio γ) between the first rotational member 10 and the second rotational member 20 can be continuously changed by changing the tilting angle. Meanwhile, at the time of acceleration herein (γ<1), the planetary ball 40 on an upper side in FIG. 1 is tilted in a counterclockwise direction on a plane of paper and the planetary ball 40 on a lower side is tilted in a clockwise direction on the plane of paper. Also, at the time of deceleration (γ>1), the planetary ball 40 on the upper side in FIG. 1 is tilted in the clockwise direction on the plane of paper and the planetary ball 40 on the lower side is tilted in the counterclockwise direction on the plane of paper.

The continuously variable transmission 1 is provided with a transmission device, which changes the transmission ratio γ. Since the transmission ratio γ is changed in association with the change in the tilting angle of the planetary ball 40, a tilting device, which tilts each of the planetary balls 40, is used as the transmission device. Herein, the transmission device is provided with a disk-shaped iris plate (tilting element) 80.

The iris plate 80 is attached to the shaft 50 through a radial bearing RB7 provided on the inner side in the radial direction and is capable of rotating relative to the shaft 50 around the first central axis of rotation R1. An actuator (drive unit) such as a motor not illustrated is used for the relative rotation. A drive force of the drive unit is transmitted to an outer peripheral portion of the iris plate 80 through a worm gear 81.

Figure 4:
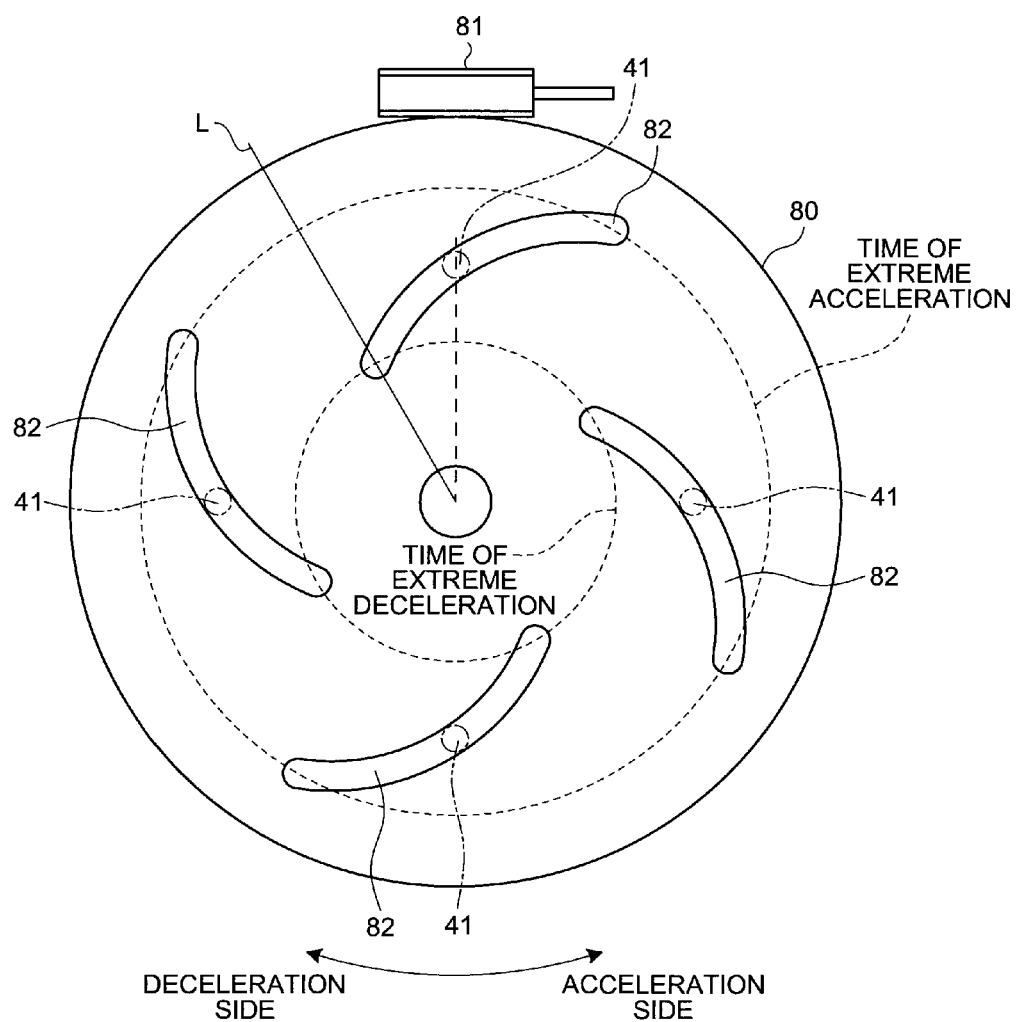
FIG. 4 is a view for explaining an iris plate.

The iris plate 80 is arranged on an input side (contacting portion side with the first rotational member 10) or an output side (contacting portion side with the second rotational member 20) of each of the planetary balls 40 and on an outer side of the carrier 60. In this illustration, this is arranged on the input side. A diaphragm hole (iris hole) 82 into which one of the projections of the support shaft 41 is inserted is formed on the iris plate 80. Supposing that the radial direction starting from an end on the inner side in the radial direction is a reference line L, the diaphragm hole 82 has an arc shape separating from the reference line L in the circumferential direction from the inner side in the radial direction toward the outer side in the radial direction (FIG. 4). Meanwhile, FIG. 4 is a view seen in the direction indicated by the arrow A in FIG. 1.

One of the projections of the support shaft 41 moves toward a center of the iris plate 80 along the diaphragm hole 82 by rotation of the iris plate 80 in the clockwise direction on the plane of paper in FIG. 4. At that time, since the projections of the support shaft 41 are inserted into the guide grooves 63 and 64 of the carrier 60, respectively, one of the projections inserted into the diaphragm hole 82 radially inwardly moves. Also, the one of the projections moves on an outer peripheral side of the iris plate 80 along the diaphragm hole 82 by the rotation of the iris plate 80 in the counterclockwise direction on the plane of paper in FIG. 4. At that time, the one of the projections radially outwardly moves by action of the guide grooves 63 and 64. In this manner, the support shaft 41 can radially move by the guide grooves 63 and 64 and the diaphragm hole 82. Therefore, the planetary ball 40 can perform the above-described tilting operation.

In the continuously variable transmission 1, it is desirable that positional displacement of each of the planetary balls 40 in the axis line direction (axis line direction of the first central axis of rotation R1) is inhibited or more preferably that the positional displacement is eliminated so as to prevent the planetary ball 40 from interfering with the carrier 60. In the continuously variable transmission 1, the movement of the planetary ball 40 relative to the sun roller 30 in the axis line direction is inhibited by the concave portion 32 of the above-described sun roller 30, so that the positional displacement of the planetary ball 40 in the axis line direction is inhibited.

Further, in order to inhibit the positional displacement, in the continuously variable transmission 1, it is preferable that a movable amount $\Delta Tss$ of the sun roller 30 relative to the shaft 50 in the axis line direction is decreased. This is because the planetary ball 40 might move together with the movement of the sun roller 30 in the axis line direction. Therefore, the continuously variable transmission 1 is provided with a positioning structure (third positioning structure), which sets the movable amount $\Delta Tss$ of the sun roller 30 relative to the shaft 50 in the axis line direction.

For example, in the continuously variable transmission 1, the annular portions 61a and 62a are provided on the first and second disk-shaped members 61 and 62 of the carrier 60, respectively, and by decreasing the distances between free ends of the annular portions 61a and 62a and side surfaces of the radial bearings RB5 and RB6, respectively, the movable amount $\Delta Tss$ of the sun roller 30 relative to the shaft 50 in the axis line direction can be decreased. From this, the third positioning structure can be composed of the annular portions 61a and 62a of the carrier 60 and the radial bearings RB5 and RB6 of the sun roller 30.

Herein, since the carrier 60 is fixed to the shaft 50 so as to prevent the relative movement thereof in the axis line direction in this illustration, it can be said that the movable amount $\Delta Tss$ is a movable amount $\Delta Tsc$ of the sun roller 30 relative to the carrier 60 in the axis line direction ($\Delta Tsc=\Delta Tss$). Therefore, the movable amount $\Delta Tsc$ can be obtained by a following equation 1. Then, it can be said that the third positioning structure is configured to set the movable amount $\Delta Tsc$ of the sun roller 30 relative to the carrier 60 in the axis line direction.

$$\Delta Tsc=Ic-Is \qquad (1)$$

The term "Ic" in the equation 1 represents the distance between the free end of the annular portion 61a and the free end of the annular portion 62a as illustrated in FIG. 1. The term "Is" represents the distance between the side surface of the radial bearing RB5 on a right side of the plane of paper in FIG. 1 and the side surface of the radial bearing RB6 on a left side of the plane of paper in FIG. 1.

Meanwhile, although a gap between the sun roller 30 (strictly, the radial bearings RB5 and RB6) and the carrier 60 (strictly, the free ends of the annular portions 61a and 62a) in the axis line direction is made the movable amount $\Delta Tsc$ in this illustration, when an elastic member such as a coil spring is arranged in the gap, a maximum movement amount between the sun roller 30 and the carrier 60 obtained by expansion and contraction of the elastic member is made the movable amount $\Delta Tsc$.

In this manner, the continuously variable transmission 1 can inhibit the positional displacement of the planetary ball 40 in the axis line direction by the concave portion 32 provided on the rolling surface of the sun roller 30 and decrease in the movable amount $\Delta Tss$ of the sun roller 30 relative to the shaft 50 in the axis line direction (movable amount $\Delta Tsc$ of the sun roller 30 relative to the carrier 60 in the axis line direction).

Here, a factor to cause the positional displacement of the planetary ball 40 in the axis line direction herein includes the movement of the first rotational member 10 and the second rotational member 20 in the axis line direction in addition to this. Examining this point, in the continuously variable transmission 1, while the second rotational member 20 is arranged on the outer peripheral surface side of the shaft 50, the first rotational member 10 is arranged on an outer peripheral surface side of the second rotational member 20. Although the movement of the first rotational member 10 relative to the second rotational member 20 to the right of the plane of paper in FIG. 1 is regulated by the torque cam 71, the movement thereof relative to the second rotational member 20 to the left of the plane of paper in FIG. 1 can be performed within an operating range of the torque cam 71 in the axis line direction, for example. On the other hand, a movable amount $\Delta Touts$ of the second rotational member 20 relative to the shaft 50 in the axis line direction is regulated by a locking member 93 arranged on a side surface side of the radial bearing RB1 (right side of the plane of paper in FIG. 1) and a locking member 94 arranged on a side surface side of the radial bearing RB2 (left side of the plane of paper in FIG. 1). Therefore, when focusing only on the first and second rotational members 10 and 20, an effect of the movement of the second rotational member 20 to which the shaft 50 is attached in the axis line direction to the planetary ball 40 is larger, so that this can move in the axis line direction within the range of the movable amount $\Delta Touts$.

Since the carrier 60 is fixed to the shaft 50, it can be said that the movable amount $\Delta Touts$ is a movable amount $\Delta Toutc$ of the second rotational member 20 relative to the carrier 60 in the axis line direction ($\Delta Toutc=\Delta Touts$). Therefore, the movable amount $\Delta Toutc$ can be obtained by a following equation 2.

$$\Delta Toutc=Isr-Ir \qquad (2)$$

The term "Isr" in the equation 2 represents the distance between the locking member 93 and the locking member 94 as illustrated in FIG. 1. The term "Ir" represents the distance between a side surface of the radial bearing RB1 on the right side of the plane of paper in FIG. 1 and a side surface of the radial bearing RB2 on the left side of the plane of paper in FIG. 1.

Meanwhile, although a gap between the second rotational member 20 (strictly, the radial bearings RB1 and RB2) and the carrier 60 (strictly, the locking members 93 and 94) in the axis line direction is made the movable amount $\Delta$Toutc in this illustration, when the elastic member such as the coil spring is arranged in the gap, a maximum movement force between the second rotational member 20 and the carrier 60 obtained by the expansion and contraction of the elastic member is made the movable amount $\Delta$Toutc.

In the continuously variable transmission 1, the torque cam 71, the annular member 72, the thrust bearing TB, the radial bearings RB3 and RB4 of the first rotational member 10 and the input shaft 11, and a following second positioning structure compose a first positioning structure, which sets a movable amount $\Delta$Tinc of the first rotational member 10 relative to the carrier 60 in the axis line direction. Also, the locking members 93 and 94, the radial bearings RB1 and RB2 of the second rotational member 20 and the output shaft 21, and holding grooves of the locking members 93 and 94 on the shaft 50 compose the second positioning structure, which sets the movable amount $\Delta$Toutc of the second rotational member 20 relative to the carrier 60 in the axis line direction.

Then, in the movable amount $\Delta$Tsc (=$\Delta$Tss) of the sun roller 30 relative to the carrier 60 in the axis line direction, deviation associated with stack of dimensional accuracy (that is to say, dimensional tolerance) in the axis line direction of the sun roller 30, the radial bearings RB5 and RB6, the carrier 60, the locking members 91 and 92, and attaching grooves of the locking members 91 and 92 on the shaft 50 at a maximum and assembling accuracy (that is to say, tolerance at the time of assembling) thereof are generated. Also, in the movable amount $\Delta$Toutc (=$\Delta$Touts) of the second rotational member 20 relative to the carrier 60 in the axis line direction, the deviation associated with the stack of the dimensional accuracy (dimensional tolerance) in the axis line direction of the second rotational member 20, the radial bearings RB1 and RB2, the carrier 60, the locking members 93 and 94, and the attaching grooves of the locking members 93 and 94 on the shaft 50 at a maximum and the assembling accuracy (tolerance at the time of assembling) thereof are generated.

A position of the planetary ball 40 in the axis line direction is subjected to an effect of the dimensional accuracy and the assembling accuracy of components related to the second rotational member 20 in addition to the dimensional accuracy and the assembling accuracy of the components related to the sun roller 30, the carrier 60, and the planetary ball 40 when the movable amount $\Delta$Tsc is larger than the movable amount $\Delta$Toutc or when the movable amount $\Delta$Tsc equals to the movable amount $\Delta$Toutc. Therefore, in this case, the position of the planetary ball 40 in the axis line direction is determined by the dimensional accuracy and the assembling accuracy in addition to the movable amount $\Delta$Toutc. On the other hand, when the movable amount $\Delta$Tsc is smaller than the movable amount $\Delta$Toutc, the position of the planetary ball 40 in the axis line direction is determined by the movable amount $\Delta$Tsc and the dimensional accuracy and the assembling accuracy of the components related to the sun roller 30, the carrier 60, and the planetary ball 40 without being subjected to the effect of the components related to the second rotational member 20.

Meanwhile, the components related to the sun roller 30 are intended to mean naturally the sun roller 30 itself, and the radial bearings RB5 and RB6 press-fitted thereto. The components related to the carrier 60 are intended to mean the carrier 60 itself, the locking members 91 and 92, which lock the same, and the shaft 50 to which the locking members 91 and 92 are attached. The components related to the planetary ball 40 are intended to mean the planetary ball 40 itself, the support shaft 41, which supports the same, and the bearing, and strictly the carrier 60, the iris plate 80 and the like, which hold the support shaft 41.

In general, the larger the stack-up tolerance is, the more the interval between the components (corresponding to the above-described movable amount $\Delta$Tsc, the movable amount $\Delta$Toutc and the like) is increased, thereby preventing the components from interfering with each other. In other words, the smaller the number of components, which are targets of the stack of the tolerance, the more the interval between the components can be decreased, so that a size of a product can be made smaller.

Then, in the continuously variable transmission 1, the movable amount $\Delta$Tsc (=$\Delta$Tss) of the sun roller 30 relative to the carrier 60 in the axis line direction is set to be smaller than the movable amount $\Delta$Toutc (=$\Delta$Touts) of the second rotational member 20 relative to the carrier 60 in the axis line direction ($\Delta$Tsc<$\Delta$Toutc).

According to this, the continuously variable transmission 1 is not subjected to the effect of the components related to the second rotational member 20 when the position of the planetary ball 40 in the axis line direction is determined, so that the number of components, which require the accuracy in the axis line direction, can be decreased. That is to say, as for the components related to the second rotational member 20, highly accurate tolerance management is not necessary as compared to the components related to the sun roller 30, the carrier 60, and the planetary ball 40. Therefore, the continuously variable transmission 1 can improve positioning accuracy of the planetary ball 40 in the axis line direction while reducing a cost. The tolerance management is for inhibiting the positional displacement of the planetary ball 40 in the axis line direction and is intended to mean decrease in the dimensional tolerance and regulation of assembling positions of the components in the axis line direction.

Also, since the number of components, which are the targets of the stack of the tolerance, is small in the continuously variable transmission 1, the stack-up tolerance becomes small. Therefore, the interval between the planetary ball 40 and the carrier 60 in the axis line direction can be decreased in the continuously variable transmission 1, so that this can be made compact.

Further, in the continuously variable transmission 1, the first rotational member 10 and the second rotational member 20 can still move in the axis line direction even when the sun roller 30 abuts the carrier 60 by its setting, so that the planetary ball 40 pressed against the sun roller 30 by the first rotational member 10 and the second rotational member 20 can move to the central portion of the concave portion 32 (most concave portion).

Second Embodiment

Next, a second embodiment of the continuously variable transmission according to the present invention is described.

The continuously variable transmission 1 of the first embodiment sets the movable amount $\Delta$Tsc (=$\Delta$Tss) of the sun roller 30 relative to the carrier 60 in the axis line direction so as to be smaller than the movable amount $\Delta$Toutc (=$\Delta$Touts) of the second rotational member 20 relative to the carrier 60 in the axis line direction. In this embodiment, in the continuously variable transmission 1, when setting the movable amount $\Delta$Tsc so as to be smaller than the movable amount $\Delta$Toutc, the movable amount $\Delta$Tsc is set to 0 ($\Delta$Tsc=0). It is because the continuously variable transmission 1 can obtain the effect similar to the above-described one even when this is set in this manner. Especially, the interval between the planetary ball 40 and the carrier 60 in the axis line direction is further decreased in the continuously variable transmission 1 in this case, so that this can be made further compact. In addition to the effect, the setting that the movable amount ΔTsc is set to 0 can prevent a phenomenon that the sun roller 30 (strictly, the radial bearings RB5 and RB6) pushed to be moved in the axis line direction by skew of each of the planetary balls 40 collides with the carrier 60. Meanwhile, the skew occurs at the time of switching from drive to non-drive of the continuously variable transmission 1, for example. In the continuously variable transmission 1, by elimination of such collision, generation of a sound associated with the collision is eliminated, so that silence can be improved. Also, in the continuously variable transmission 1, generation of oscillation associated with the collision can also be eliminated and further, durability of the radial bearings RB5 and RB6 can be improved.

For example, in the continuously variable transmission 1 in this case, it is possible to prevent movement of the sun roller 30 in the axis line direction by allowing the free ends of the annular portions 61a and 62a to abut side surfaces of inner rings of the radial bearings RB5 and RB6. However, in this method, the movable amount ΔTsc might be generated according to the dimensional accuracy in the axis line direction of the sun roller 30, the annular portions 61a and 62a and the like and the assembling accuracy thereof. Therefore, a following structure illustrated in FIG. 5 or 6 is preferably adopted when the movable amount ΔTsc is surely set to 0.

Figure 5:
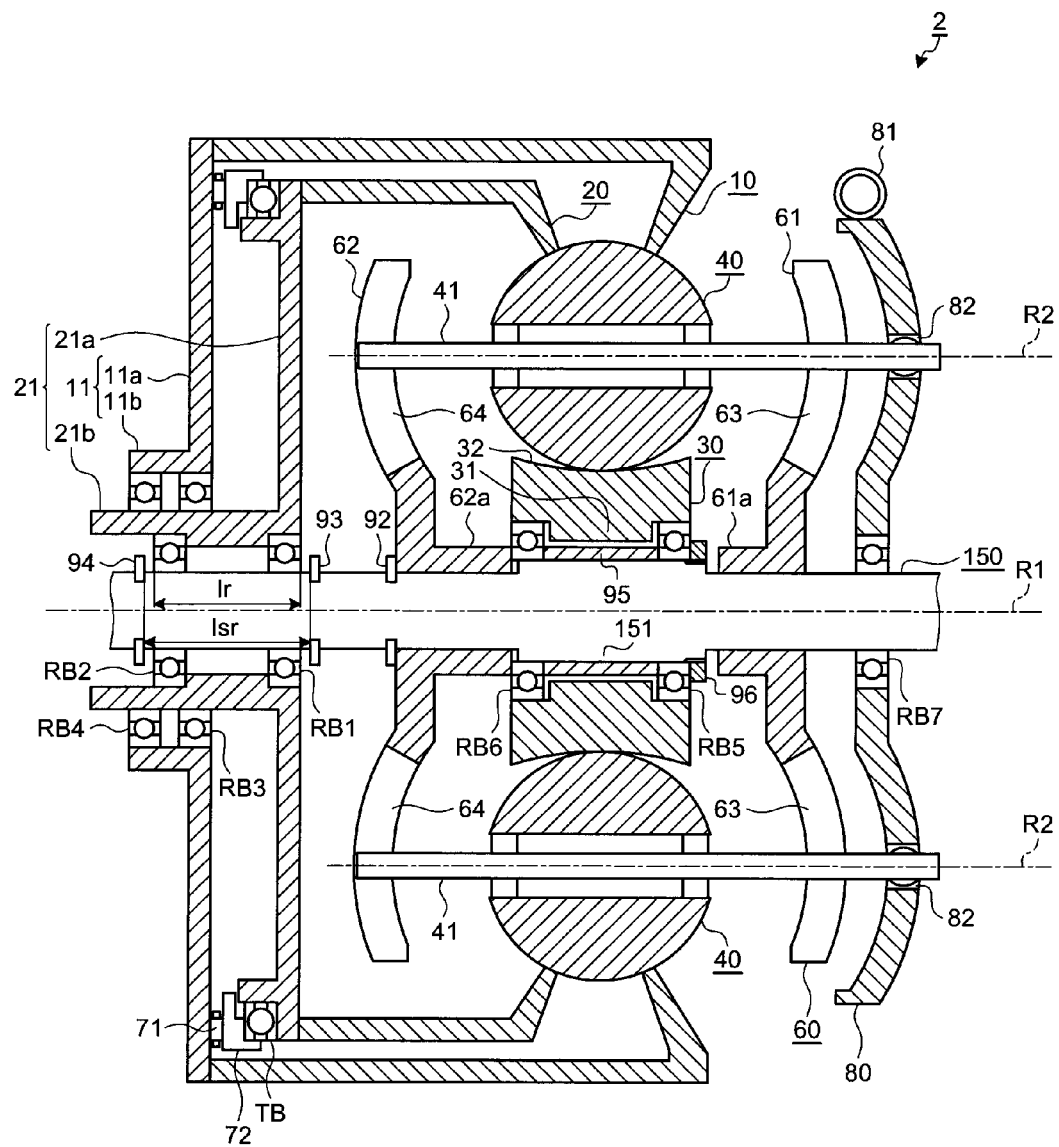
FIG. 5 is a partial cross-sectional view for illustrating a configuration of a second embodiment of the continuously variable transmission according to the present invention.
Figure 6:
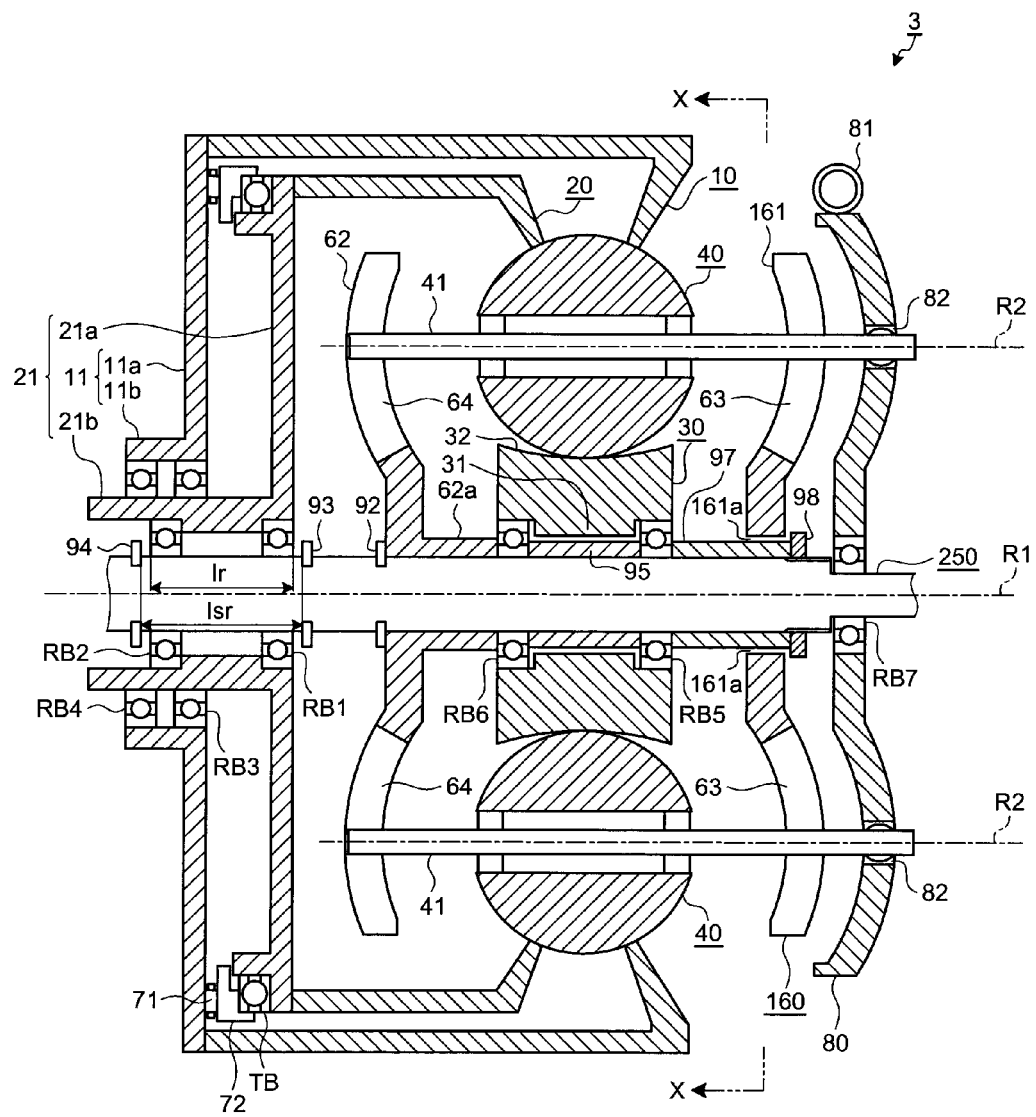
FIG. 6 is a partial cross-sectional view for illustrating a configuration of another mode of the second embodiment of the continuously variable transmission according to the present invention.

A reference sign 2 illustrated in FIG. 5 represents an example of the continuously variable transmission in which the movable amount ΔTsc is set to 0. A continuously variable transmission 2 is different in configuration from the above-described continuously variable transmission 1 as follows.

First, in the continuously variable transmission 2, a shaft 150 is arranged in place of the shaft 50. The shaft 150 has a protruded portion 151 protruded radially outwardly on the outer peripheral surface side of the shaft 50. The protruded portion 151 is a columnar portion or a cylindrical portion concentric with a substantial part of the shaft 150. The sun roller 30 is held by the shaft 150 through the radial bearings RB5 and RB6 inserted into an outer peripheral surface of the protruded portion 151. However, the radial bearing RB6 is allowed to project in the axis line direction than an end (herein, the end on the left side of the plane of paper in FIG. 5) of the protruded portion 151 for allowing the side surface of the inner ring thereof to abut the free end of the annular portion 62a.

Also, in the continuously variable transmission 2, a cylindrical member 95 longer than the annular portion 31 of the sun roller 30 in the axis line direction is arranged between the radial bearing RB5 and the radial bearing RB6. The cylindrical member 95 has an inner diameter equivalent to that of the inner rings of the radial bearings RB5 and RB6 and an outer diameter smaller than the inner diameter of the outer rings thereof and is inserted into the outer peripheral surface of the protruded portion 151. In the continuously variable transmission 2, by presence of the cylindrical member 95, when an outer force in the axis line direction is applied from outside to the radial bearings RB5 and RB6, a force by the outer force acts between the inner rings of the radial bearings RB5 and RB6 and the cylindrical member 95, but this does not act on the sun roller 30, so that the rotational operation of the sun roller 30 in the circumferential direction is not blocked.

Also, in the continuously variable transmission 2, a fastening member, which presses the sun roller 30 toward the carrier 60 in the axis line direction is arrange. For example, in the continuously variable transmission 2, a male screw is threaded on an outer peripheral surface of the end (herein, the end on the right side of the plane of paper in FIG. 5) of the protruded portion 151 and a female screw member (for example, a nut) 96 threadably mounted thereon is arranged as the fastening member. In the continuously variable transmission 2, by fastening the female screw member 96, the intervals between each of the annular portion 62a, the radial bearings RB5 and RB6, and the cylindrical member 95 are narrowed and the movable amount ΔTsc is finally set to 0. The female screw member 96 has a shape to generate the axial force only on the inner ring of the radial bearing RB5. Therefore, in the continuously variable transmission 2, the outer force in the axis line direction is applied to the inner ring of the radial bearing RB5 in association with the fastening, however, the rotational operation of the sun roller in the circumferential direction is not blocked by this as described above, so that deterioration in fuel consumption by increase in drive loss can be prevented.

In the continuously variable transmission 2, the third positioning structure is composed of the annular portion 62a of the carrier 60, the radial bearings RB5 and RB6 of the sun roller 30, the cylindrical member 95, the female screw member 96, and the shaft 150.

Herein, the continuously variable transmission 2 can surely set the movable amount ΔTsc to 0, so that the effect of the assembling accuracy is eliminated, and by performing the tolerance management of the dimensional accuracy of the components related to the sun roller 30, the carrier 60, and the planetary ball 40, the positioning of the planetary ball 40 in the axis line direction becomes possible.

However, in the continuously variable transmission 2, it is not possible to form the carrier 60 to have the basket shape in advance at the time of assembling, and the basket-shaped carrier 60 is formed by sequentially inserting the second disk-shaped member 62 and the sun roller 30 to which the radial bearings RB5 and RB6 and the cylindrical member 95 are attached into the shaft 150, fastening them with the female screw member 96, and thereafter inserting the first disk-shaped member 61 into the shaft 150. Therefore, in the continuously variable transmission 2, it is not possible to regulate the size in the axis line direction within a range of the dimensional tolerance in a state of the carrier 60 alone, so that the cost might increase when taking a jig for regulating the size and assembling workability into consideration. In a continuously variable transmission 3 illustrated in FIG. 6, this point is improved.

The continuously variable transmission 3 differs in the configuration from the above-described continuously variable transmission 1 as follows.

First, in the continuously variable transmission 3, the cylindrical member 95 similar to that of the continuously variable transmission 2 is arranged between the radial bearings RB5 and RB6. Therefore, in the continuously variable transmission 3 also, regardless of whether the outer force in the axis line direction acts on the radial bearings RB5 and RB6, the rotational operation of the sun roller 30 in the circumferential direction is not blocked by the outer force.

Figure 7:
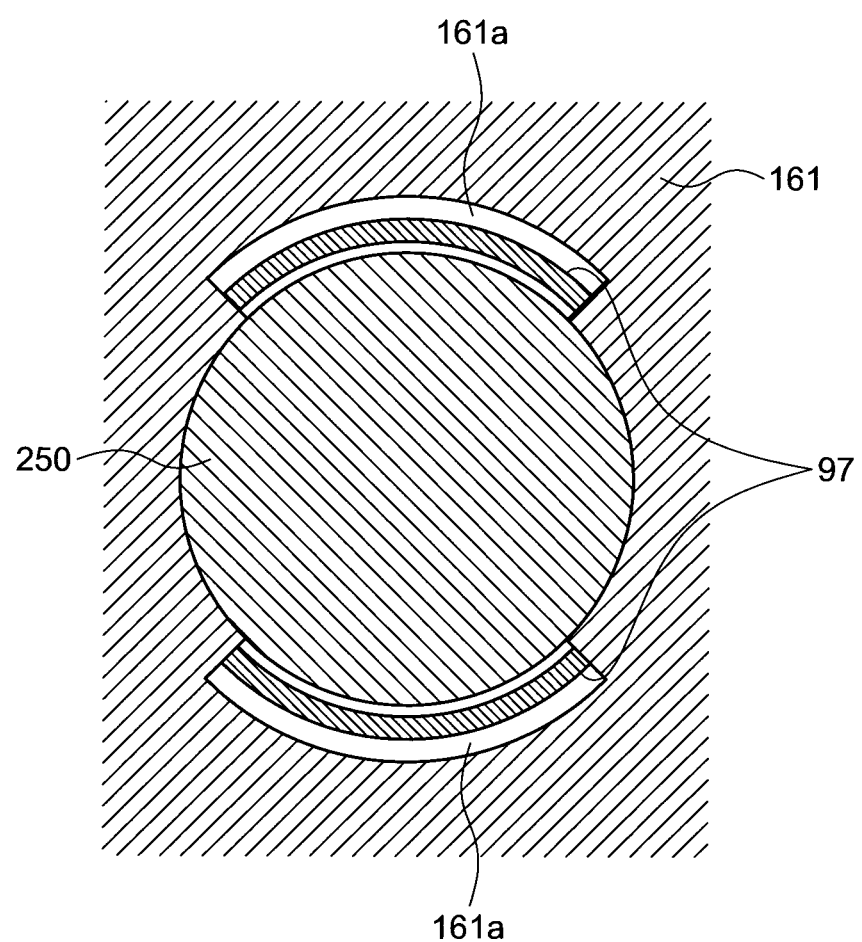
FIG. 7 is a cross-sectional view of an axial force transmitting member and the like taken along line X-X in FIG. 6.

Further, an axial force transmitting member 97 capable of transmitting the axial force toward the cylindrical member 95 side to the inner ring of the radial bearing RB5 is arranged on the continuously variable transmission 3. The axial force transmitting member 97 has the inner diameter equivalent to that of the inner ring of the radial bearing RB5 and the outer diameter smaller than the inner diameter of the outer ring and is arranged on a side opposite to the cylindrical member 95 across the radial bearing RB5 on a shaft 250 (right side of the plane of paper in FIG. 6). Therefore, the axial force transmitting member 97 can allow one end thereof to abut the side surface of the radial bearing RB5 on a side opposite to the side surface of the inner ring with which the cylindrical member 95 comes into contact, thereby transmitting the axial force from the side surface. Specifically, the axial force transmitting member 97 has a circular-arc shaped divided structure, which sandwiches the shaft 250 from the outer side in the radial direction as illustrated in FIG. 7. In the axial force transmitting member 97, the above-described axial force is generated by the fastening of a female screw member (for example, the nut) 98 as the fastening member arranged on the other end thereof.

In the continuously variable transmission 3, at the time of assembling, the cylindrical member 95 is inserted in the sun roller 30 and the radial bearings RB5 and RB6 are press-fitted thereto from both ends thereof. Also, a carrier 160 is formed to have the basket shape. In the continuously variable transmission 3, the sun roller 30 is arranged in the carrier 160 and the shaft 250 is inserted thereinto as in the continuously variable transmission 1. Then, the axial force transmitting member 97 is inserted into the shaft 250 to be fastened by the female screw member 98.

Therefore, in the carrier 160, the first disk-shaped member 61 in the carrier 60 illustrated above is replaced with a first disk-shaped member 161. In contrast to the first disk-shaped member 61, the first disk-shaped member 161 has an opening with which insertion work of the axial force transmitting member 97 is possible and a state in which the axial force transmitting member 97 is inserted can be kept formed on an inner peripheral surface side thereof. Herein, a groove portion 161a is formed as the opening. According to this, a gap is provided between an inner peripheral surface of the first disk-shaped member 161 and an outer peripheral surface of the shaft 250, so that the axial force transmitting member 97 can be inserted through the gap. Then, in the carrier 160, it is possible to fit or press-fit the inner peripheral surface other than the groove portion 161a of the first disk-shaped member 161 to the outer peripheral surface of the shaft 250, so that concentric arrangement with the shaft 250 becomes possible. Meanwhile, the annular portion 61a as that of the first disk-shaped member 61 is not provided on the first disk-shaped member 161.

Also, in order to enable the fastening by the female screw member 98 after the insertion into the shaft 250, a length in the axis line direction of the axial force transmitting member 97 is set to the length such that the other end is projected on the right side of the plane of paper in FIG. 6 than the first disk-shaped member 161 in a state in which this is assembled to the shaft 250.

In the shaft 250, the male screw portion is threaded on the outer peripheral surface corresponding to arrangement of the female screw member 98 on the shaft 50 illustrated above. In the shaft 250, the outer diameter of a portion on the right side of the plane of paper in FIG. 6 than the male screw portion is made smaller than the outer diameter of a portion on which the sun roller 30 and the like is arranged, thereby enabling the threadable mount the female screw member 98 on the male screw portion. The iris plate 80 is attached to the small diameter portion through the radial bearing RB7.

In the continuously variable transmission 3, the third positioning structure is composed of the annular portion 62a of the carrier 160, the radial bearings RB5 and RB6 of the sun roller 30, the cylindrical member 95, the axial force transmitting member 97, the female screw member 98, and the shaft 250.

The continuously variable transmission 3 can surely set the movable amount ΔTsc to 0 as compared to the continuously variable transmission 1. Also, the continuously variable transmission 3 can perform assembling work of the sun roller 30 and the like after assembling the carrier 160 as compared to the continuously variable transmission 2. Therefore, in the continuously variable transmission 3, the assembling workability is improved as compared to the continuously variable transmission 2 and further the cost of the jig for keeping the dimensional accuracy of the carrier 160 in the axis line direction in a defined region and of the assembling work can be reduced. Further, in the continuously variable transmission 3, the carrier 160 obtained by assemblage of the first disk-shaped member 161, the second disk-shaped member 62, and the connecting shaft 65 can be replaced with the one having an integral structure by casting, powder metallurgy and the like as compared to the continuously variable transmission 2, so that the cost can be reduced by decrease in the number of components. That is to say, the continuously variable transmission 3 can surely set the movable amount ΔTsc to 0 at the low cost while obtaining excellent assembling workability.

Third Embodiment

Next, a third embodiment of the continuously variable transmission according to the present invention is described.

In the continuously variable transmissions 1, 2, and 3 of the above-described first and second embodiment, the displacement of the planetary ball 40 relative to the sun roller 30 in the axis line direction is not considered due to the concave portion 32. However, the planetary ball 40 might be displaced relative to the sun roller 30 in the axis line direction. This is because spin moment is generated in the planetary ball 40 at the time of drive and the support shaft 41 is displaced relative to the first central axis of rotation R1 by the gap in the groove width direction between the same and the above-described guide grooves 63 and 64 and the minute backlash by the bearing and the like by the spin moment. Then, since the rotational direction of the planetary ball 40 is displaced relative to the rotational direction of the sun roller 30 by the displacement of the support shaft 41, a sideslip speed determined by the rotational speed of the sun roller 30 and the rotational speed of the planetary ball 40 is generated between the sun roller 30 and the planetary ball 40 at that time and a sideslip force acts by the sideslip speed. The planetary ball 40 might move on the concave portion 32 by the sideslip force associated with the displacement of the support shaft 41 to be displaced relative to the sun roller 30 in the axis line direction. Meanwhile, the sideslip force is the force in the axis line direction when the planetary ball 40 is present on the center of the concave portion 32 and is the force in a direction along the curved surface of the concave portion 32 when the planetary ball 40 is displaced from the center of the concave portion 32. This embodiment takes the displacement of the planetary ball 40 relative to the sun roller 30 in the axis line direction into consideration.

Figure 8:
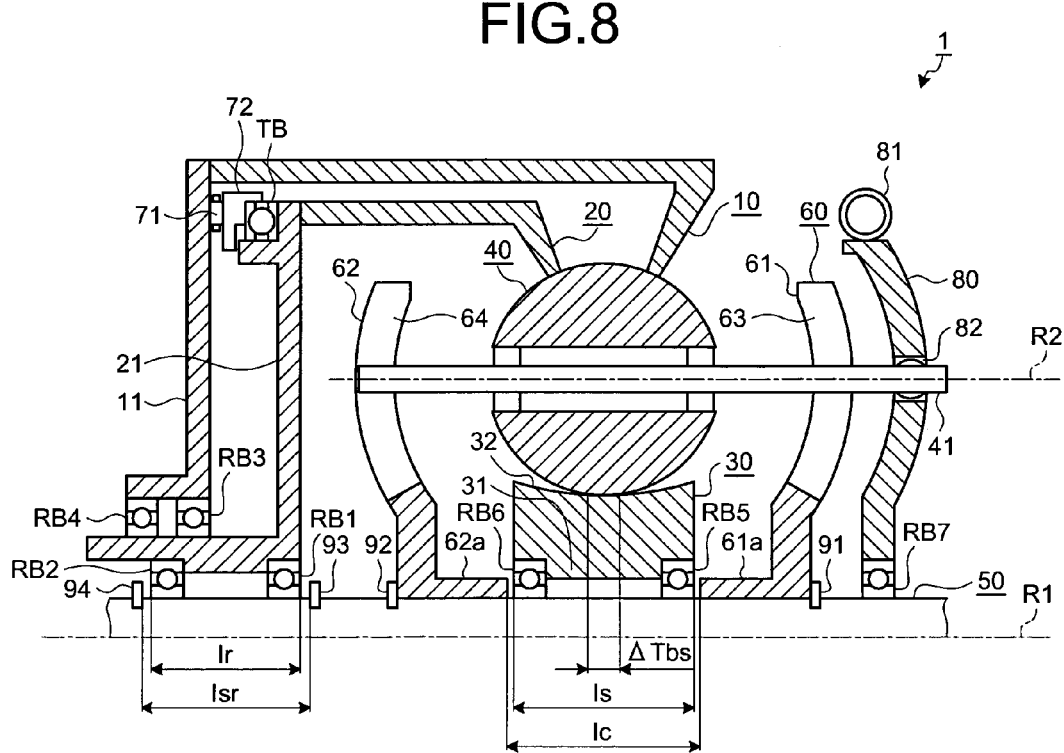
FIG. 8 is a partial cross-sectional view for explaining the continuously variable transmission of a third embodiment.

First, a movable amount ΔTbs of the planetary ball 40 relative to the sun roller 30 in the axis line direction illustrated in FIG. 8 is described.

The movable amount ΔTbs is obtained by adding a maximum moving distance Δd1 when a sideslip force Fss1 in one direction acts and a maximum moving distance Δd2 when a sideslip force Fss2 in an opposite direction acts (equation 3).

$$\Delta Tbs = \Delta d1 + \Delta d2 \quad (3)$$

Figure 9:
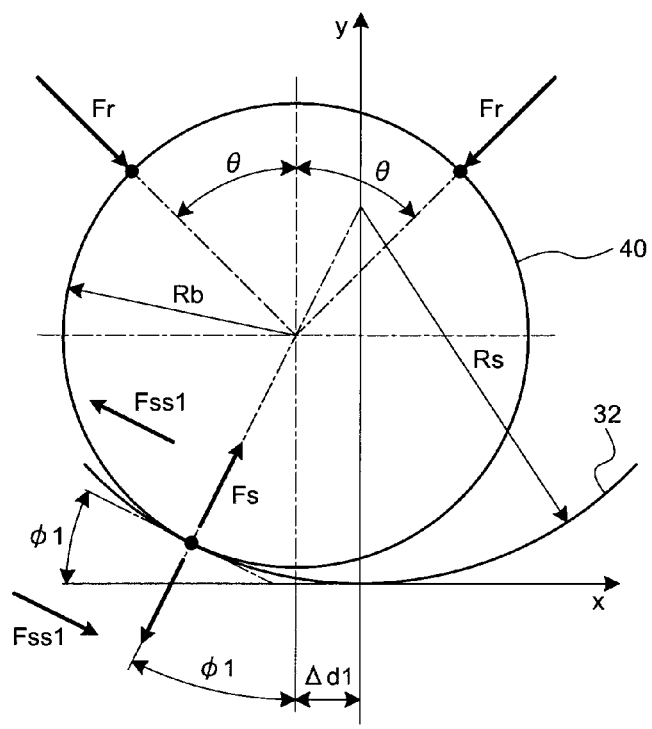
FIG. 9 is a view for explaining positional displacement between a planetary ball and the sun roller.

A normal force Fr from the first rotational member 10 and the second rotational member 20 and a normal force Fs from the sun roller 30 act on the planetary ball 40 as illustrated in FIG. 9. The normal force Fr is determined by the axial force of the torque cam 71 and the like, for example. Also, the normal force Fs is determined by the normal force Fr, the sideslip force Fss1 (Fss2) and the like. When the sideslip force Fss1 in one direction acts, the planetary ball 40 moves on the concave portion 32 to make an angle $\phi 1$ at which an x-directional component of the sideslip force Fss1 and the x-directional component of the normal force Fr from the first and second rotational members 10 and 20 are equilibrated. Herein, the moving distance of the planetary ball 40 from the center of the concave portion 32 in the axis line direction in an equilibrated state in FIG. 9 becomes the maximum moving distance $\Delta d1$ of the planetary ball 40 relative to the sun roller 30 in the axis line direction when the sideslip force Fss1 in one direction acts (equation 4).

$$\Delta d1=(Rs-Rb)*\sin\phi 1 \qquad (4)$$

The term "Rs" in the equation 4 represents a radius of the concave portion 32 and the term "Rb" represents the radius of the planetary ball 40.

Herein, in a state in which the forces are equilibrated, following equilibrium equation 5 of the x-directional component and equilibrium equation 6 of the y-directional component are established.

$$Fss1*\cos\phi 1+Fs*\sin\phi 1=0 \qquad (5)$$

$$-2*Fr*\cos\theta+Fs*\cos\phi 1+Fss1*\sin\phi 1=0 \qquad (6)$$

A following equation 7 is an arithmetic expression derived from the equations 5 and 6. By the equation 7, the angle $\phi 1$ at which the forces are equilibrated can be obtained.

$$\sin\phi 1=Fss1/(2*Fr*\cos\theta) \qquad (7)$$

On the other hand, when the sideslip force Fss2 in the opposite direction acts, the maximum moving distance $\Delta d2$ of the planetary ball 40 relative to the sun roller 30 in the axis line direction is derived by a following equation 8.

$$\Delta d2=(Rc-Rb)*\sin\phi 2 \qquad (8)$$

The term "$\phi 2$" represents an angle at which the sideslip force Fss2 in the opposite direction acts and each force is in the equilibrated state. The angle $\phi 2$ can be obtained by a following equation 9 being the arithmetic expression similar to that of the angle $\phi 1$.

$$\sin\phi 2=Fss2/(2*Fr*\cos\theta) \qquad (9)$$

The movable amount $\Delta Tbs$ of the planetary ball 40 relative to the sun roller 30 in the axis line direction can be obtained by the arithmetic expression obtained by substituting the equations 4 and 8 in the equation 3 (equation 10).

$$\Delta Tbs=\Delta d1+\Delta d2=(Rc-Rb)*(\sin\phi 1+\sin\phi 2) \qquad (10)$$

In the continuously variable transmission 1 of the first embodiment, the planetary ball 40 is positioned in the axis line direction by setting the movable amount $\Delta Tsc$ ($=\Delta Tss$) of the sun roller 30 relative to the carrier 60 in the axis line direction so as to be smaller than the movable amount $\Delta Toutc$ ($=\Delta Touts$) of the second rotational member 20 relative to the carrier 60 in the axis line direction. Therefore, in the continuously variable transmission 1, in a case in which the movable amount $\Delta Tbs$ of the planetary ball 40 relative to the sun roller 30 in the axis line direction is larger than a sum of the movable amount $\Delta Tsc$ and the movable amount $\Delta Toutc$ or is as large as the sum, when the planetary ball 40 is displaced relative to the sun roller 30 in the axis line direction by the sideslip force Fss1 (Fss2) associated with the displacement of the support shaft 41, the sideslip force Fss1 (Fss2) is absorbed by the radial bearing RB6 (RB5) and the rotational operation of the sun roller 30 might be blocked.

Also, in the continuously variable transmissions 1, 2, and 3 of the second embodiment, the planetary ball 40 is positioned in the axis line direction by decreasing the movable amount $\Delta Tsc$ to 0. Therefore, in the continuously variable transmissions 1, 2, and 3, in a case in which the movable amount $\Delta Tbs$ is larger than the movable amount $\Delta Toutc$ or is as large as the movable amount $\Delta Toutc$, the sideslip force Fss1 (Fss2) is absorbed by the radial bearing RB6 (RB5) by the displacement of the planetary ball 40 relative to the sun roller 30 in the axis line direction and the rotational operation of the sun roller 30 might be blocked.

Therefore, although it is required to replace the radial bearings RB5 and RB6 with those of which rating capacity is large in the continuously variable transmissions 1, 2, and 3, for example, in this case, sizes of the continuously variable transmissions 1, 2, and 3 become larger and the cost increases while the rotational operation of the sun roller 30 becomes smoother, so that this is not preferable. Also, for example, it is possible to replace the radial bearings RB5 and RB6 with an angular bearing, a tapered roller bearing and the like capable of absorbing a thrust force, however, in this case, while the rotational operation of the sun roller 30 becomes smoother, precompression is needed and slide resistance increases, so that this is not preferable.

Then, the continuously variable transmission 1 of this embodiment based on the first embodiment sets the movable amount $\Delta Tsc$ so as to be smaller than the movable amount $\Delta Toutc$ as in the first embodiment ($\Delta Tsc<\Delta Toutc$) and sets the movable amount $\Delta Tbs$ so as to be smaller than the sum of the movable amount $\Delta Tsc$ and the movable amount $\Delta Toutc$ ($\Delta Tbs<\Delta Tsc+\Delta Toutc$). According to this, in the continuously variable transmission 1, the radial bearing RB6 (RB5) is not subjected to the force in the axis line direction (thrust force) by the sideslip force Fss1 (Fss2).

Figure 10:
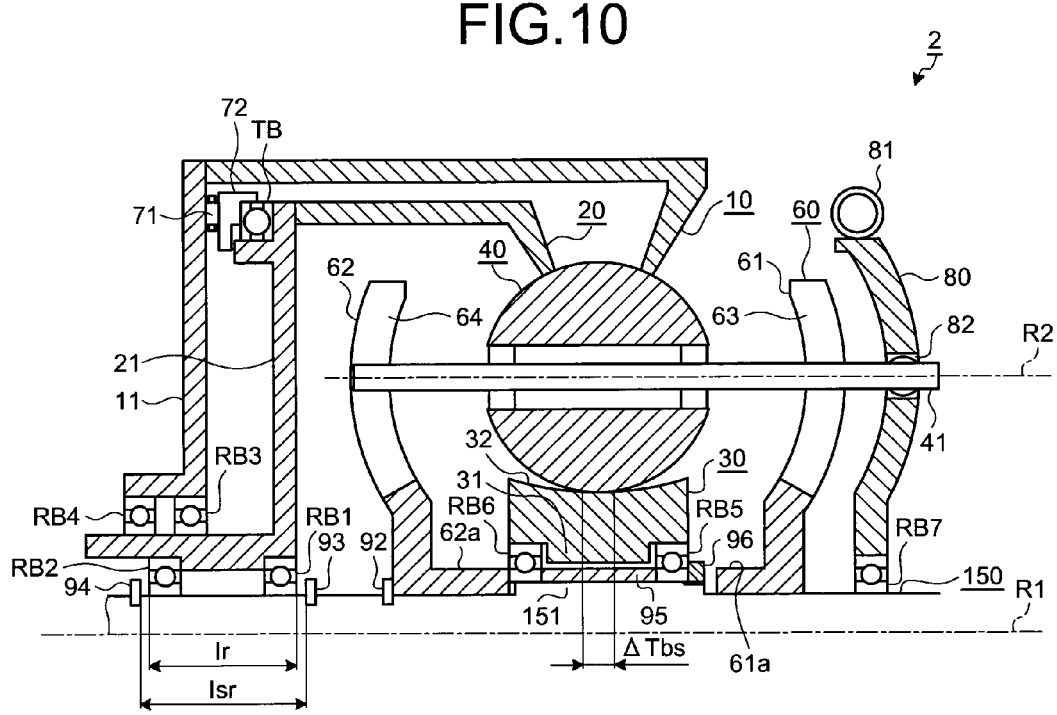
FIG. 10 is a partial cross-sectional view for explaining the continuously variable transmission of another mode of the third embodiment.

Also, the continuously variable transmissions 1, 2, and 3 of this embodiment based on the second embodiment set the movable amount $\Delta Tsc$ to 0 as in the second embodiment ($\Delta Tsc=0$) and set the movable amount $\Delta Tbs$ so as to be smaller than the movable amount $\Delta Toutc$ ($\Delta Tbs<\Delta Toutc$). According to this, in the continuously variable transmissions 1, 2, and 3, the radial bearing RB6 (RB5) is not subjected to the force in the axis line direction (thrust force) by the sideslip force Fss1 (Fss2). Meanwhile, FIG. 10 illustrates the continuously variable transmission 2 as representation.

As described above, in the continuously variable transmissions 1, 2, and 3 of this embodiment, the thrust force by the sideslip force Fss1 (Fss2) is not applied to the radial bearing RB6 (RB5). Therefore, in the continuously variable transmissions 1, 2, and 3 of this embodiment, the rating capacity of the radial bearings RB5 and RB6 can be made smaller than those illustrated in the first and second embodiments, so that the size and a weight can be decreased, and further the cost can be reduced. Also, the continuously variable transmissions 1, 2, and 3 of this embodiment can use a low-loss bearing such as a cylindrical roller bearing without using the bearing, which needs the precompression, with large slide resistance such as the angular bearing and the tapered roller bearing for the rotation of the sun roller 30, so that this can improve the fuel consumption by reduction in loss.

Herein, the continuously variable transmission may be set as follows in order to obtain the effect similar to that of the continuously variable transmissions 1, 2, and 3 of this embodiment.

Figure 11:
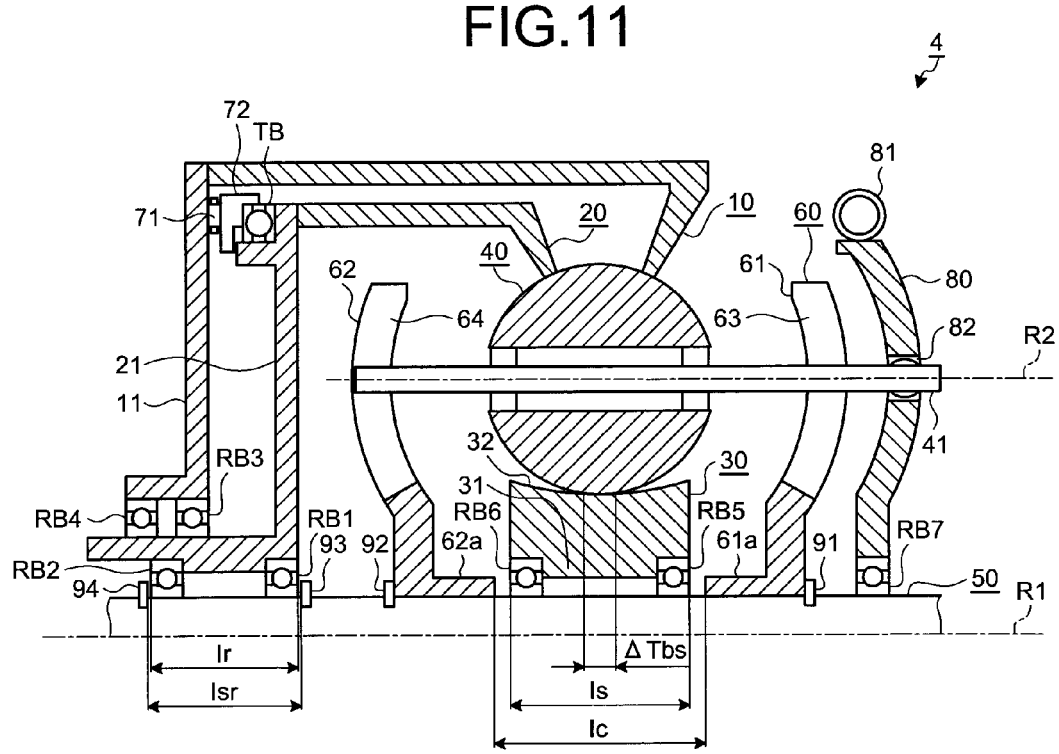
FIG. 11 is a partial cross-sectional view for explaining the continuously variable transmission of another mode of the third embodiment.

Although a continuously variable transmission 4 illustrated in FIG. 11 has the same configuration as that of the continuously variable transmission 1, unlike the continuously variable transmission 1, this sets the movable amount $\Delta Toutc$ ($=\Delta Touts$) of the second rotational member 20 relative to carrier 60 in the axis line direction so as to be smaller than the movable amount $\Delta Tsc$ ($=\Delta Tss$) of the sun roller 30 relative to the carrier 60 in the axis line direction ($\Delta Toutc<\Delta Tsc$) and sets the movable amount ΔTbs of the planetary ball 40 relative to the sun roller 30 in the axis line direction so as to be smaller than the sum of the movable amount ΔTsc and the movable amount ΔToutc (ΔTbs<ΔTsc+ΔToutc).

Figure 12:
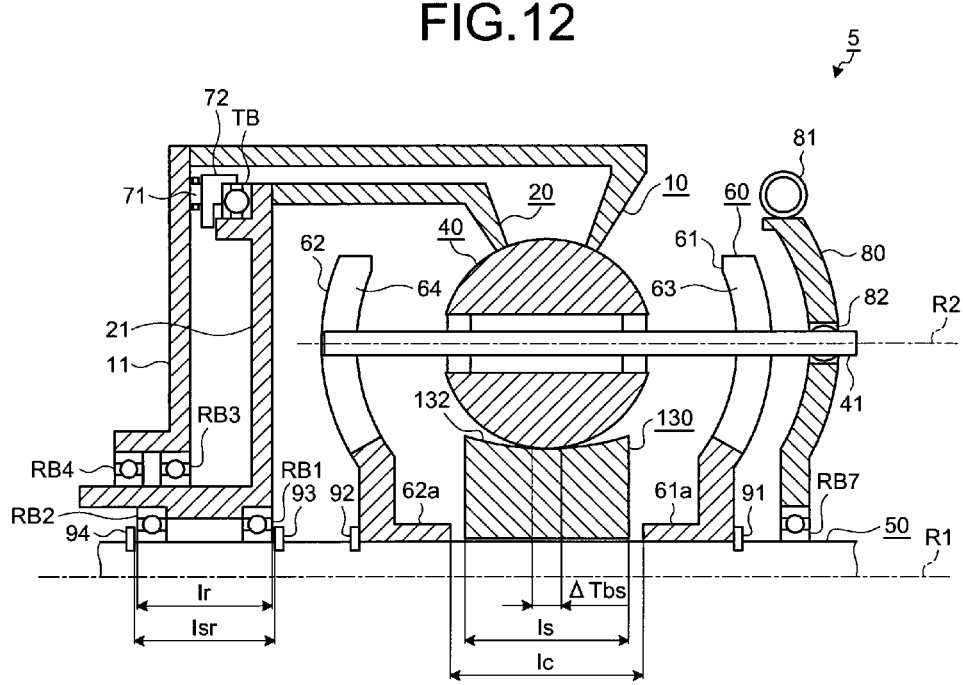
FIG. 12 is a partial cross-sectional view for explaining the continuously variable transmission of another mode of the third embodiment.

By this setting, the continuously variable transmission 4 is capable of not only obtaining the effect similar to that of the continuously variable transmissions 1, 2, and 3 of this embodiment but also preventing the sun roller 30 and the carrier 60 from interfering with each other. Therefore, the radial bearings RB5 and RB6 are not required in the continuously variable transmission 4 as a continuously variable transmission 5 illustrated in FIG. 12.

The continuously variable transmission 5 is obtained by inserting a sun roller 130 into the shaft 50 without providing the radial bearings RB5 and RB6 in the continuously variable transmission 4. Therefore, the number of components can be decreased in the continuously variable transmission 5 as compared to the continuously variable transmission 4, so that reduction in cost becomes possible. Meanwhile, in the continuously variable transmission 5, the sun roller 130 is supported by a plurality of planetary balls 40 arranged on a concave portion 132. The concave portion 132 has the same shape as the concave portion 32 of the sun roller 30.

Figure 13:
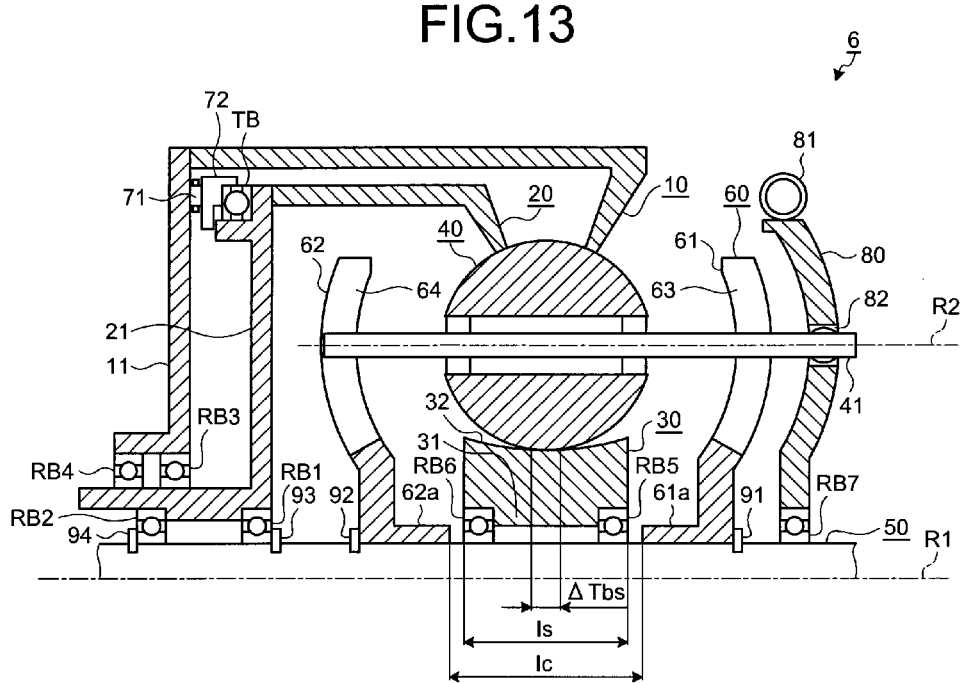
FIG. 13 is a partial cross-sectional view for explaining the continuously variable transmission of another mode of the third embodiment.

Also, a continuously variable transmission 6 illustrated in FIG. 13 is obtained by setting the movable amount ΔToutc (=ΔTouts) to 0 (ΔToutc=0) and setting the movable amount ΔTbs so as to be smaller than the movable amount ΔTsc (ΔTbs<ΔTsc) in the continuously variable transmission 4. By setting in this manner, the continuously variable transmission 6 can obtain the effect similar to that of the continuously variable transmissions 1, 2, and 3 of this embodiment. Further, in the continuously variable transmission 6, the sun roller 30 can be replaced with the sun roller 130 as in the continuously variable transmission 5, so that the radial bearings RB5 and RB6 are not necessary and the cost can be reduced.

Fourth Embodiment

Next, a fourth embodiment of the continuously variable transmission according to the present invention is described.

Figure 14:
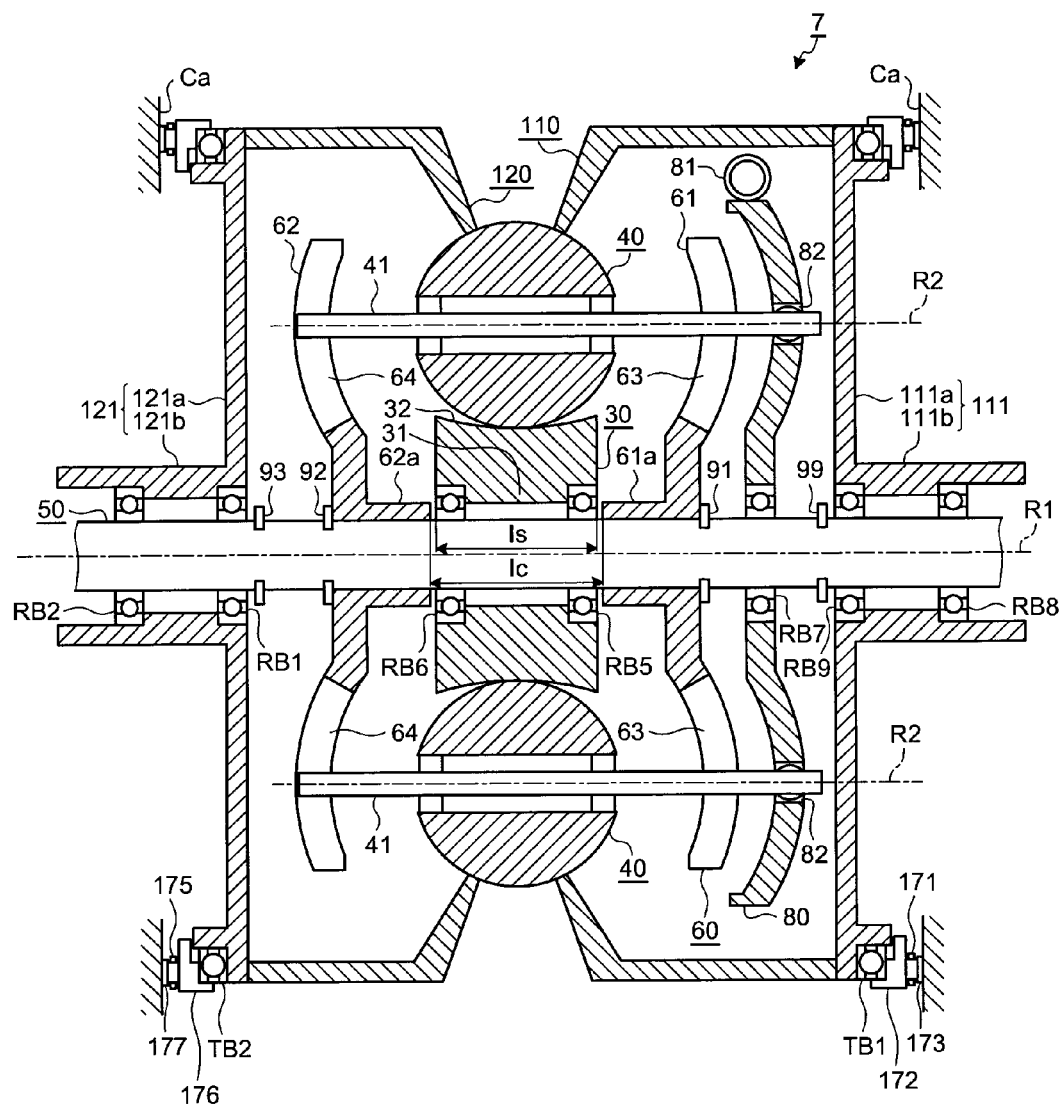
FIG. 14 is a partial cross-sectional view for illustrating a configuration of a fourth embodiment of the continuously variable transmission according to the present invention.

In the continuously variable transmissions 1 to 6 of the above-described first to third embodiments, the input shaft 11 and the output shaft 21 are arranged together on one side as seen from the planetary ball 40, for example, and the input shaft 11 is arranged on the output shaft 21 through the radial bearings RB3 and RB4. Therefore, in the continuously variable transmissions 1 to 6, it is only necessary to observe the movable amount ΔToutc of the second rotational member 20 and the output shaft 21 relative to the carrier 60 (160) in the axis line direction as a target of comparison with the movable amount ΔTsc of the sun roller 30 (130) relative to the carrier 60 (160) in the axis line direction, and it is not necessary to observe the movable amount ΔTinc of the first rotational member 10 and the input shaft 11 relative to the carrier 60 (160) in the axis line direction. However, when the input shaft 11 and the output shaft 21 are arranged in directions different from each other across the planetary ball 40, in the continuously variable transmission, it is necessary to observe not only the movable amount ΔToutc of the second rotational member 20 and the output shaft 21 relative to the carrier 60 (160) in the axis line direction but also the movable amount ΔTinc of the first rotational member 10 and the input shaft 11 relative to the carrier 60 (160) in the axis line direction as the target of comparison with the movable amount ΔTsc. This is because the first rotational member 10 and the second rotational member 20 of the continuously variable transmission can individually move relative to the shaft 50 (150, 250) in the axis line direction. This embodiment describes this type of continuously variable transmission. A reference sign 7 in FIG. 14 represents the continuously variable transmission of this embodiment.

The continuously variable transmission 7 replaces the first rotational member 10 and the input shaft 11 with a first rotational member 110 and the input shaft 111, respectively, and replaces the second rotational member 20 and the output shaft 21 with a second rotational member 120 and an output shaft 121, respectively, in the continuously variable transmission 1 of the first embodiment. Also, the continuously variable transmission 4 replaces the components such as the bearing related to the first rotational member 10, the input shaft 11, the second rotational member 20, and the output shaft 21 in the continuously variable transmission 1 of the first embodiment as follows.

The first rotational member 110 and the second rotational member 120 have the shape similar to that of the second rotational member 20 illustrated above. Further, an input shaft 111 and the output shaft 121 have the shape similar to that of the output shaft 21 illustrated above. Therefore, the input shaft 111 is provided with a disk-shaped portion 111a and a cylindrical portion 111b of which central axes conform to the first central axis of rotation R1. Also, the output shaft 121 is provided with a disk-shaped portion 121a and a cylindrical portion 121b of which central axes conform to the first central axis of rotation R1.

In the input shaft 111, a torque cam 171, an annular member 172, and a thrust bearing TB1 are arranged between a flat surface on an outer peripheral side of the disk-shaped portion 111a and a casing Ca. The thrust bearing TB1 can rotate the input shaft 111 and the annular member 172 relative to each other. The torque cam 171 generates the axial force to press the first rotational member 110 against the planetary ball 40 by engagement of the engaging member on a casing Ca side and the engaging member on the annular member 172 side. In this illustration, an elastic member 173 such as the coil spring is arranged between the engaging member on the casing Ca side and the casing Ca. The elastic member 173 is configured to generate a resilient force in the axis line direction for pressing the first rotational member 110 against the planetary ball 40 at the time of non-drive and is arranged in a state in which an initial load by the resilient force is applied to the annular member 172. Also, an inner peripheral surface of the cylindrical portion 111b of the input shaft 111 is attached to the outer peripheral surface of the shaft 50 through radial bearings RB8 and RB9. That is to say, the input shaft 111 can rotate relative to the shaft 50 in the circumferential direction by the radial bearings RB8 and RB9 and the thrust bearing TB1.

Herein, in the input shaft 111, the movement of the first rotational member 110 relative to the shaft 50 in the axis line direction toward the planetary ball 40 side is regulated by a locking member 99 such as the snap ring arranged on a side surface side (left side of the plane of paper in FIG. 14) of the radial bearing RB9. A movable amount ΔTins of the first rotational member 110 relative to the shaft 50 in the axis line direction is the moving distance from a state in which the elastic member 173 is most contracted to a state in which the radial bearing RB9 abuts the locking member 99 and it can be said that this is the movable amount ΔTinc of the first rotational member 110 relative to the carrier 60 in the axis line direction (ΔTinc=ΔTins).

In the continuously variable transmission 7, the first positioning structure is composed of the locking member 99, the radial bearings RB8 and RB9 of the first rotational member 110 and the input shaft 111, the torque cam 171, the annular member 172, the thrust bearing TB1, the elastic member 173, the shaft 50, and the casing Ca.

On the other hand, in the output shaft 121, a torque cam 175, an annular member 176, and a thrust bearing TB2 are arranged between a flat surface on an outer peripheral side of the disk-shaped portion 121a and the casing Ca. The thrust bearing TB2 can rotate the output shaft 121 and the annular member 176 relative to each other. The torque cam 175 generates the axial force to press the second rotational member 120 against the planetary ball 40 by the engagement of the engaging member on the casing Ca side and the engaging member on the annular member 176 side. In this illustration, an elastic member 177 such as the coil spring is arranged between the engaging member on the casing Ca side and the casing Ca. The elastic member 177 is configured to generate the resilient force in the axis line direction for pressing the second rotational member 120 against the planetary ball 40 at the time of non-drive and is arranged in a state in which the initial load by the resilient force is applied to the annular member 176. Also, an inner peripheral surface of the cylindrical portion 121b of the output shaft 121 is attached to the outer peripheral surface of the shaft 50 through the radial bearings RB1 and RB2. That is to say, the output shaft 121 can rotate relative to the shaft 50 in the circumferential direction by the radial bearings RB1 and RB2 and the thrust bearing TB2.

Herein, in the output shaft 121, the movement of the second rotational member 120 relative to the shaft 50 in the axis line direction toward the planetary ball 40 side is regulated by the locking member 93 arranged on the side surface side (right side of the plane of paper in FIG. 14) of the radial bearing RB1. The movable amount $\Delta$Touts of the second rotational member 120 relative to the shaft 50 in the axis line direction is the moving distance from a state in which the elastic member 177 is most contracted to a state in which the radial bearing RB1 abuts the locking member 93 and it can be said that this is the movable amount $\Delta$Toutc of the second rotational member 120 relative to the carrier 60 in the axis line direction ($\Delta$Toutc=$\Delta$Touts).

In the continuously variable transmission 7, the second positioning structure is composed of the locking member 93, the radial bearings RB1 and RB2 of the second rotational member 120 and the output shaft 121, the torque cam 175, the annular member 176, the thrust bearing TB2, the elastic member 177, the shaft 50, and the casing Ca.

In the continuously variable transmission 7, the movable amount $\Delta$Tsc (=$\Delta$Tss) of the sun roller 30 relative to the carrier 60 in the axis line direction is set to be smaller than a smaller one of the movable amount $\Delta$Tinc (=$\Delta$Tins) of the first rotational member 110 relative to the carrier 60 in the axis line direction and the movable amount $\Delta$Toutc (=$\Delta$Touts) of the second rotational member 120 relative to the carrier 60 in the axis line direction. According to this, the continuously variable transmission 7 can obtain the effect similar to that of the continuously variable transmission 1 of the first embodiment.

Further, the continuously variable transmission 7 may set the movable amount $\Delta$Tsc so as to be smaller than the smaller one of the movable amount $\Delta$Tinc and the movable amount $\Delta$Toutc and set the movable amount $\Delta$Tbs so as to be smaller than a sum of the movable amount $\Delta$Tsc and the smaller one of the movable amount $\Delta$Tinc and the movable amount $\Delta$Toutc based on an idea similar to that of the setting of the continuously variable transmission 1 of the third embodiment. According to the continuously variable transmission 7 of this setting, the effect similar to that of the continuously variable transmission 1 of the third embodiment can be obtained.

Herein, the continuously variable transmission 7 of this embodiment may set the movable amount $\Delta$Tsc to 0 by allowing the free ends of the annular portions 61a and 62a to abut the side surfaces of the inner rings of the radial bearings RB5 and RB6 as in the continuously variable transmission 1 of the second embodiment and can obtain the effect similar to that of the continuously variable transmission 1. Also, in order to set the movable amount $\Delta$Tsc to 0, it is possible to provide the cylindrical member 95 and the female screw member 96 of the continuously variable transmission 2 on the continuously variable transmission 7 and replace the shaft 50 with the shaft 150, and according to this, the effect similar to that of the continuously variable transmission 2 can be obtained. Also, for this purpose, it is possible to provide the cylindrical member 95, the axial force transmitting member 97, and the female screw member 98 of the continuously variable transmission 3 and replace the carrier 60 and the shaft 50 with the carrier 160 and the shaft 250 of the continuously variable transmission 3, respectively, and according to this, the effect similar to that of the continuously variable transmission 3 can be obtained.

Further, in various continuously variable transmissions in which the movable amount $\Delta$Tsc is set to 0 based on the continuously variable transmission 7, based on the idea similar to that of the continuously variable transmissions 1, 2, and 3 of the third embodiment, in addition to the setting, it is possible to set the movable amount $\Delta$Tbs so as to be smaller than the smaller one of the movable amount $\Delta$Tinc and the movable amount $\Delta$Toutc. According to the continuously variable transmissions, it is possible to obtain the effect similar to that of the continuously variable transmissions 1, 2, and 3 of the third embodiment.

Also, the continuously variable transmission 7 of this embodiment may set a larger one of the movable amount $\Delta$Tinc and the movable amount $\Delta$Toutc so as to be smaller than the movable amount $\Delta$Tsc and may set the movable amount $\Delta$Tbs so as to be smaller than the sum of the movable amount $\Delta$Tsc and the smaller one of the movable amount $\Delta$Tinc and the movable amount $\Delta$Toutc based on the idea similar to that of the continuously variable transmission 4 of the third embodiment. According to the continuously variable transmission 7, the effect similar to that of the continuously variable transmission 4 can be obtained. Then, the continuously variable transmission 7 can prevent the sun roller 30 and the carrier 60 from interfering with each other, so that it is possible to replace the sun roller 30 with the sun roller 130 and the effect similar to that of the continuously variable transmission 5 of the third embodiment can be obtained.

Also, if the continuously variable transmission 7 of this embodiment can set the movable amount $\Delta$Tinc and the movable amount $\Delta$Toutc to 0 based on the idea similar to that of the continuously variable transmission 6 of the third embodiment, this may set the movable amount $\Delta$Tbs so as to be smaller than the movable amount $\Delta$Tsc together with the setting. According to the continuously variable transmission 7, the effect similar to that of the continuously variable transmission 6 can be obtained.

Reference Signs List 1, 2, 3, 4, 5, 6, 7 CONTINUOUSLY VARIABLE TRANSMISSION 10, 110 FIRST ROTATIONAL MEMBER (FIRST ROTATIONAL ELEMENT)

11, 111 INPUT SHAFT (FIRST ROTATIONAL SHAFT)

20, 120 SECOND ROTATIONAL MEMBER (SECOND ROTATIONAL ELEMENT)

21, 121 OUTPUT SHAFT (SECOND ROTATIONAL SHAFT)

30, 130 SUN ROLLER (THIRD ROTATIONAL ELEMENT)
32, 132 CONCAVE PORTION
40 PLANETARY BALL (ROLLING MEMBER)
41 SUPPORT SHAFT
50, 150, 250 SHAFT (TRANSMISSION SHAFT)
60, 160 CARRIER (FIXED ELEMENT)
61, 161 FIRST DISK-SHAPED MEMBER
61A ANNULAR PORTION
62 SECOND DISK-SHAPED MEMBER
62a ANNULAR PORTION
65 CONNECTING SHAFT
71, 171, 175 TORQUE CAM
72, 172, 176 ANNULAR MEMBER
80 IRIS PLATE
91, 92, 93, 94, 99 LOCKING MEMBER
95 CYLINDRICAL MEMBER
96, 98 FEMALE SCREW MEMBER
97 AXIAL FORCE TRANSMITTING MEMBER
161a GROOVE PORTION
173, 177 ELASTIC MEMBER
Ca CASING
R1 FIRST CENTRAL AXIS OF ROTATION
R2 SECOND CENTRAL AXIS OF ROTATION
RB1 to RB9 RADIAL BEARING
TB, TB1, TB2 THRUST BEARING

The invention claimed is:

1. A continuously variable transmission, comprising:
a transmission shaft as a fixed shaft being a center of rotation;
a relatively rotatable first rotational element and a relatively rotatable second rotational element having a common first central axis of rotation arranged so as to be opposed to each other on the transmission shaft;
a plurality of rolling members each having a second central axis of rotation parallel to the first central axis of rotation radially arranged around the first central axis of rotation to be sandwiched between the first rotational element and the second rotational element;
a support shaft of each of the rolling members having the second central axis of rotation with both ends projected from the rolling member;
a third rotational element with each of the rolling members arranged on a concave portion of which caved radially inwardly on an outer peripheral surface, capable of rotating relative to the transmission shaft, the first rotational element, and the second rotational element;
a fixed element fixed to the transmission shaft, that holds the rolling member through each projection of the support shaft;
a transmission device that changes a rotational ratio between the first rotational element and the second rotational element by tilting operation of each of the rolling members;
a first rotational shaft and a second rotational shaft individually fixed to the first rotational element and the second rotational element, respectively;
a first positioning structure that sets a movable amount of the first rotational element relative to the fixed element in an axis line direction;
a second positioning structure that sets the movable amount of the second rotational element relative to the fixed element in the axis line direction; and
a third positioning structure that sets the movable amount of the third rotational element relative to the fixed element in the axis line direction, wherein
the second rotational shaft fixed to the second rotational element is arranged such that rotation relative to the transmission shaft around the first central axis of rotation can be performed, and the first rotational shaft fixed to the first rotational element is arranged such that the rotation relative to the second rotational shaft around the first central axis of rotation can be performed on an outer peripheral surface of the second rotational shaft, and
the movable amount of the third rotational element relative to the fixed element in the axis line direction is set to be smaller than the movable amount of the second rotational element relative to the fixed element in the axis line direction.

2. The continuously variable transmission according to claim 1, wherein the movable amount of the rolling member relative to the third rotational element in the axis line direction generated by a sideslip force associated with displacement of the support shaft is set to be smaller than a sum of the movable amount of the second rotational element relative to the fixed element in the axis line direction and the movable amount of the third rotational element relative to the fixed element in the axis line direction.

3. The continuously variable transmission according to claim 2, wherein the third positioning structure sets the movable amount of the third rotational element relative to the fixed element in the axis line direction to 0 by a fastening member that presses the third rotational element toward the fixed element in the axis line direction.

4. The continuously variable transmission according to claim 3, wherein the third positioning structure provides an axial force transmitting member inserted into an opening of the fixed element between the third rotational element and the fastening member.

5. The continuously variable transmission according to claim 4, wherein the fixed element is integrally formed.

6. The continuously variable transmission according to claim 1, wherein the third positioning structure sets the movable amount of the third rotational element relative to the fixed element in the axis line direction to 0 by a fastening member that presses the third rotational element toward the fixed element in the axis line direction.

7. The continuously variable transmission according to claim 6, wherein the third positioning structure provides an axial force transmitting member inserted into an opening of the fixed element between the third rotational element and the fastening member.

8. The continuously variable transmission according to claim 7, wherein the fixed element is integrally formed.

9. A continuously variable transmission, comprising:
a transmission shaft as a fixed shaft being a center of rotation;
a relatively rotatable first rotational element and a relatively rotatable second rotational element having a common first central axis of rotation arranged so as to be opposed to each other on the transmission shaft;
a plurality of rolling members each having a second central axis of rotation parallel to the first central axis of rotation radially arranged around the first central axis of rotation to be sandwiched between the first rotational element and the second rotational element;
a support shaft of each of the rolling members having the second central axis of rotation with both ends projected from the rolling member;
a third rotational element with each of the rolling members arranged on a concave portion of which caved radially inwardly on an outer peripheral surface, capable of rotating relative to the transmission shaft, the first rotational element, and the second rotational element;

a fixed element fixed to the transmission shaft, which holds the rolling member through each projection of the support shaft;

a transmission device that changes a rotational ratio between the first rotational element and the second rotational element by tilting operation of each of the rolling members;

a first rotational shaft and a second rotational shaft individually fixed to the first rotational element and the second rotational elements, respectively, capable of rotating relative to the transmission shaft around the first central axis of rotation on an outer peripheral surface of the transmission shaft;

a first positioning structure that sets a movable amount of the first rotational element relative to the fixed element in an axis line direction;

a second positioning structure that sets the movable amount of the second rotational element relative to the fixed element in the axis line direction; and a third positioning structure that sets the movable amount of the third rotational element relative to the fixed element in the axis line direction, wherein the movable amount of the third rotational element relative to the fixed element in the axis line direction is set to be smaller than a smaller one of the movable amount of the first rotational element relative to the fixed element in the axis line direction and the movable amount of the second rotational element relative to the fixed element in the axis line direction.

10. The continuously variable transmission according to claim 9, wherein the movable amount of the rolling member relative to the third rotational element in the axis line direction generated by a sideslip force associated with displacement of the support shaft is set to be smaller than a sum of the smaller one of the movable amount of the first rotational element relative to the fixed element in the axis line direction and the movable amount of the second rotational element relative to the fixed element in the axis line direction, and the movable amount of the third rotational element relative to the fixed element in the axis line direction.

11. The continuously variable transmission according to claim 10, wherein the third positioning structure sets the movable amount of the third rotational element relative to the fixed element in the axis line direction to 0 by a fastening member that presses the third rotational element toward the fixed element in the axis line direction.

12. The continuously variable transmission according to claim 11, wherein the third positioning structure provides an axial force transmitting member inserted into an opening of the fixed element between the third rotational element and the fastening member.

13. The continuously variable transmission according to claim 12, wherein the fixed element is integrally formed.

14. The continuously variable transmission according to claim 9, wherein the third positioning structure sets the movable amount of the third rotational element relative to the fixed element in the axis line direction to 0 by a fastening member that presses the third rotational element toward the fixed element in the axis line direction.

15. The continuously variable transmission according to claim 14, wherein the third positioning structure provides an axial force transmitting member inserted into an opening of the fixed element between the third rotational element and the fastening member.

16. The continuously variable transmission according to claim 15, wherein the fixed element is integrally formed.

* * * * *